US012626475B2

(12) United States Patent (10) Patent No.: US 12,626,475 B2

Yamamoto et al. (45) Date of Patent: May 12, 2026

(54) SAMPLE OBSERVATION DEVICE AND SAMPLE OBSERVATION METHOD

(71) Applicant: HAMAMATSU PHOTONICS K.K., Hamamatsu (JP)

(72) Inventors: Satoshi Yamamoto, Hamamatsu (JP); Masanori Matsubara, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 535 days.

(21) Appl. No.: 17/928,992

(22) PCT Filed: Jun. 14, 2021

(86) PCT No.: PCT/JP2021/022547
§ 371 (c)(1),
(2) Date: Dec. 1, 2022

(87) PCT Pub. No.: WO2021/256429
PCT Pub. Date: Dec. 23, 2021

(65) Prior Publication Data
US 2023/0222753 A1 Jul. 13, 2023

(30) Foreign Application Priority Data

Jun. 16, 2020 (JP) ................................. 2020-103934

(51) Int. Cl.
*G06V 10/143* (2022.01)
*G06T 7/70* (2017.01)
(Continued)

(52) U.S. Cl.
CPC .............. *G06V 10/143* (2022.01); *G06T 7/70* (2017.01); *G06V 10/28* (2022.01); *G06V 10/60* (2022.01);
(Continued)

(58) Field of Classification Search
CPC ...... G06V 10/143; G06V 10/28; G06V 10/60; G06T 7/70; G06T 2207/10056;
(Continued)

(56) References Cited

U.S. PATENT DOCUMENTS

2017/0276598 A1    9/2017  Ikuyama
2017/0370810 A1    12/2017  Miyawaki et al.
(Continued)

FOREIGN PATENT DOCUMENTS

JP        2005-525550 A      8/2005
JP        2015191362 A    *  11/2015
(Continued)

OTHER PUBLICATIONS

Xiao Yu et al., "Review of digital holographic microscopy for three-dimensional profiling and tracking", Arxiv, Society of Photo-Optical Instrumentation Engineers, 1000 20th St. Bellingham WA 98225-6705 USA, vol. 53, No. 11, Nov. 1, 2014, p. 112306-1-p. 112306-21, XP060048121.
(Continued)

*Primary Examiner* — Matthew C Bella
*Assistant Examiner* — Andrew B. Jones
(74) *Attorney, Agent, or Firm* — Faegre Drinker Biddle & Reath LLP

(57) ABSTRACT

In a sample observation device, an image acquisition unit 6 acquires a plurality of pieces of image data of a sample in a Y-axis direction, and an image generation unit generates luminance image data on luminance of the sample on the basis of the plurality of pieces of image data, binarizes luminance values of each of the plurality of pieces of image data to generate a plurality of pieces of binarized image data, and generates area image data on an existing area of the sample on the basis of the plurality of pieces of binarized image data.

26 Claims, 17 Drawing Sheets

(51) Int. Cl.
 *G06V 10/28*   (2022.01)
 *G06V 10/60*   (2022.01)

(52) U.S. Cl.
 CPC .............. *G06T 2207/10056* (2013.01); *G06T 2207/10152* (2013.01)

(58) Field of Classification Search
 CPC ...... G06T 2207/10152; G02B 21/0076; G02B 21/16; G02B 21/26; G02B 21/367; G01N 21/6458; G01N 21/53; G01N 2021/6478; G01N 21/253; G01N 21/51; G01N 21/6452; G01N 2201/103
 See application file for complete search history.

(56)     References Cited

U.S. PATENT DOCUMENTS

| | | | |
|---|---|---|---|
| 2018/0088308 A1* | 3/2018 | Liu ...................... | G02B 21/367 |
| 2020/0041776 A1 | 2/2020 | Yamamoto et al. | |
| 2020/0132603 A1 | 4/2020 | Sugiyama et al. | |
| 2020/0158633 A1 | 5/2020 | Yamamoto et al. | |
| 2021/0018735 A1 | 1/2021 | Yamamoto | |
| 2021/0055265 A1* | 2/2021 | Maruyama ............. | G02B 27/30 |

| | | |
|---|---|---|
| 2021/0088446 A1 | 3/2021 | Sugiyama et al. |
| 2021/0116373 A1 | 4/2021 | Sugiyama et al. |
| 2021/0116692 A1 | 4/2021 | Kobayashi et al. |

FOREIGN PATENT DOCUMENTS

| | | |
|---|---|---|
| JP | 2019-159092 A | 9/2019 |
| JP | 2019-184401 A | 10/2019 |
| WO | WO-03/095986 A1 | 11/2003 |
| WO | WO-2016/117614 A1 | 7/2016 |
| WO | WO-2017/098587 A1 | 6/2017 |
| WO | WO-2019/198308 A1 | 10/2019 |

OTHER PUBLICATIONS

Kobayashi, Masanori et al., "Light Irradiation Device and Sample Observation Apparatus," U.S. Appl. No. 17/924,160, filed Nov. 9, 2022, 37 pages.

Yamamoto, Satoshi, "Sample Observation Device and Sample Observation Method," U.S. Appl. No. 17/925,131, filed Nov. 14, 2022, 41 pages.

International Preliminary Report on Patentability mailed Dec. 29, 2022 for PCT/JP2021/022547.

* cited by examiner

SAMPLE OBSERVATION DEVICE AND SAMPLE OBSERVATION METHOD

TECHNICAL FIELD

The present disclosure relates to a sample observation device and a sample observation method.

BACKGROUND ART

Selective plane illumination microscopy (SPIM) is known as one of methods for observing the inside of a sample having a three-dimensional structure such as a cell. As a technique related to such a method, for example, there is a sample observation device described in Patent Literature 1. The sample observation device of Patent literature 1 includes an irradiation optical system that irradiates a sample with planar light on an XZ surface, a scanning unit that scans the sample in a Y-axis direction with respect to an irradiation surface of the planar light, and an imaging optical system that has an observation axis inclined with respect to the irradiation surface and images an observation light generated in the sample by irradiation with the planar light. In this sample observation device, a plurality of pieces of XZ image data of the sample are acquired in the Y-axis direction, and pieces of X image data generated by integrating luminance values of an analysis area in the XZ image data in the Z direction are coupled in the Y-axis direction to generate XY image data of the sample.

CITATION LIST

Patent Literature

[Patent Literature 1] Japanese Unexamined Patent Publication No. 2019-184401

SUMMARY OF INVENTION

Technical Problem

In the sample observation device as described above, it is possible to acquire three-dimensional information on the sample in a state where the influence of variation in a luminance value of background light is sufficiently reduced. Although various feature amounts of the sample can be analyzed from the three-dimensional information, it is desirable that the sample observation device obtain an analysis result of the sample almost at the same time as the end of a measurement operation. Therefore, it is necessary to speed up the processing required from the acquisition of the XZ image data of the sample to the analysis of the sample based on the data.

The present disclosure has been made to solve the above problem, and an object of the present disclosure is to provide a sample observation device and a sample observation method capable of speeding up the processing required for sample analysis.

Solution to Problem

According to an aspect of the present disclosure, there is provided a sample observation device including: an irradiation optical system configured to irradiate a sample with planar light on an XZ surface; a scanning unit configured to scan the sample in a Y-axis direction to pass through an irradiation surface of the planar light; an imaging optical system having an observation axis inclined with respect to the irradiation surface and configured to image an observation light generated in the sample by irradiation with the planar light; an image acquisition unit configured to acquire a plurality of pieces of XZ image data corresponding to an optical image of the observation light imaged by the imaging optical system; an image generation unit configured to generate observation image data of the sample on the basis of the plurality of pieces of XZ image data acquired by the image acquisition unit; and an analysis unit configured to extract information on the sample on the basis of the observation image data and to execute analysis on the sample, wherein the image acquisition unit acquires a plurality of pieces of the XZ image data in the Y-axis direction, and wherein the image generation unit generates luminance image data on luminance of the sample on the basis of the plurality of pieces of XZ image data, binarizes luminance values of each of the plurality of pieces of XZ image data to generate a plurality of pieces of binarized XZ image data, and generates area image data on an existing area of the sample on the basis of the plurality of pieces of binarized XZ image data.

In this sample observation device, the planar light is applied on the XZ surface while the sample is scanned on the Y axis, and the plurality of pieces of XZ image data corresponding to the optical image of the observation light generated in the sample are acquired. Then, the observation image data is generated on the basis of the plurality of pieces of XZ image data, the information on the sample is extracted on the basis of the observation image data, and the analysis regarding the sample is executed. Here, in the sample observation device, when the observation image data is generated, the luminance image data on the luminance of the sample is generated on the basis of the plurality of pieces of XZ image data, the luminance values of each of the plurality of pieces of XZ image data are binarized to generate the plurality of pieces of binarized XZ image data, and the area image data on the existing area of the sample is generated on the basis of the plurality of pieces of binarized XZ image data. By performing the analysis using the necessary image data among the generated luminance image data and the area image data in this way, the amount of data to be processed can be significantly reduced, and the processing required from the acquisition of the XZ image data of the sample to the analysis of the sample can be speeded up.

The analysis unit may integrate values of each of the plurality of pieces of binarized XZ image data constituting the area image data in a Z-axis direction to generate thickness X image data and may couple pieces of the thickness X image data in the Y-axis direction to generate thickness XY image data on a thickness of the sample. In this case, the information on the thickness of the sample can be efficiently acquired and analyzed.

The analysis unit may extract a top pixel position in a Z-axis direction from each of the plurality of pieces of binarized XZ image data constituting the area image data to generate top position X image data and may couple pieces of the top position X image data in the Y-axis direction to generate top position XY image data on a top position of the sample. In this case, the analysis unit may generate top luminance XY image data indicating a luminance value at the top position of the sample on the basis of the top position XY image data and the luminance image data. As a result, the information on the top position of the sample can be efficiently acquired and analyzed.

The analysis unit may extract a bottom pixel position in a Z-axis direction from each of the plurality of pieces of binarized XZ image data constituting the area image data to generate bottom position X image data and may couple pieces of the bottom position X image data in the Y-axis direction to generate bottom position XY image data on a bottom position of the sample. In this case, the analysis unit may generate bottom luminance XY image data indicating a luminance value at the bottom position of the sample on the basis of the bottom position XY image data and the luminance image data. As a result, the information on the bottom position of the sample can be efficiently acquired and analyzed.

The analysis unit may extract a specific pixel position in a Z-axis direction from each of the plurality of pieces of binarized XZ image data constituting the area image data to generate specific position X image data and may couple pieces of the specific position X image data in the Y-axis direction to generate specific position XY image data on a specific position of the sample. In this case, the analysis unit may generate specific luminance XY image data indicating a luminance value at the specific position of the sample on the basis of the specific position XY image data and the luminance image data. As a result, the information on the specific position of the sample can be efficiently acquired and analyzed.

The analysis unit may integrate luminance values of each of the plurality of pieces of XZ image data constituting the luminance image data in a Z-axis direction to generate integrated luminance X image data and may couple pieces of the integrated luminance X image data in the Y-axis direction to generate integrated luminance XY image data on integrated luminance of the sample. In this case, in the integrated luminance X image data, the Z-axis direction component of the background light included in one pixel can be made constant, and thus the influence of variation in the luminance value of the background light can be reduced. Therefore, even in the integrated luminance XY image data obtained by coupling pieces of the integrated luminance X image data in the Y-axis direction, the influence of the background light can be sufficiently reduced.

The analysis unit may extract a maximum luminance value in a Z-axis direction from each of the plurality of pieces of XZ image data constituting the luminance image data to generate maximum luminance X image data and may couple pieces of the maximum luminance X image data in the Y-axis direction to generate maximum luminance XY image data on a maximum luminance value of the sample. In this case, the information on the distribution of the maximum luminance value of the sample in the Z-axis direction can be efficiently acquired and analyzed.

The analysis unit may extract a minimum luminance value in a Z-axis direction from each of the plurality of pieces of XZ image data constituting the luminance image data to generate minimum luminance X image data and may couple pieces of the minimum luminance X image data in the Y-axis direction to generate minimum luminance XY image data on a minimum luminance value of the sample. In this case, the information on the distribution of the minimum luminance value of the sample in the Z-axis direction can be efficiently acquired and analyzed.

The image acquisition unit may acquire a plurality of pieces of the XZ image data corresponding to an optical image of the observation light having a plurality of wavelengths, and the image generation unit may generate luminance image data on luminance of the sample on the basis of the plurality of pieces of XZ image data corresponding to an optical image of the observation light having one wavelength of the plurality of wavelengths, may binarize luminance values of each of the plurality of pieces of XZ image data corresponding to an optical image of the observation light having another wavelength of the plurality of wavelengths to generate a plurality of pieces of binarized XZ image data, and may generate area image data on an existing area of the sample on the basis of the plurality of pieces of binarized XZ image data. In this case, for example, area image data is generated using observation light having a wavelength at which it is easy to obtain the optical image, and the area image data on the existing area of the sample is generated, and thus it is possible to apply the information obtained from the area image data to the analysis in a case where the observation light having a wavelength at which it is difficult to obtain the optical image is used.

The image acquisition unit may acquire a plurality of pieces of the XZ image data corresponding to an optical image of the observation light having a plurality of wavelengths, and the image generation unit may binarize luminance values of each of the plurality of pieces of XZ image data corresponding to an optical image of the observation light having one wavelength of the plurality of wavelengths to generate a plurality of pieces of first binarized XZ image data, may generate luminance image data on luminance of the sample on the basis of the first binarized XZ image data, may binarize luminance values of each of the plurality of pieces of XZ image data corresponding to an optical image of the observation light having another wavelength of the plurality of wavelengths to generate a plurality of pieces of second binarized XZ image data, and may generate area image data on an existing area of the sample on the basis of the plurality of pieces of second binarized XZ image data. In this case, for example, area image data is generated using observation light having a wavelength at which it is easy to obtain the optical image, and the area image data on the existing area of the sample is generated, and thus it is possible to apply the information obtained from the area image data to the analysis in a case where the observation light having a wavelength at which it is difficult to obtain the optical image is used.

According to an aspect of the present disclosure, there is provided a sample observation method including: an irradiation step of irradiating a sample with planar light on an XZ surface; a scanning step of scanning the sample in a Y-axis direction to pass through an irradiation surface of the planar light; an imaging step of imaging of an observation light generated in the sample by irradiation with the planar light using an imaging optical system having an observation axis inclined with respect to the irradiation surface; an image acquisition step of acquiring a plurality of pieces of XZ image data corresponding to an optical image of the observation light imaged by the imaging optical system; an image generation step of generating observation image data of the sample on the basis of the plurality of pieces of XZ image data; and an analysis step of extracting information on the sample on the basis of the observation image data and executing analysis on the sample, wherein, in the image acquisition step, a plurality of pieces of the XZ image data are acquired in the Y-axis direction, and wherein, in the image generation step, luminance image data on luminance of the sample is generated on the basis of the plurality of pieces of XZ image data, luminance values of each of the plurality of pieces of XZ image data are binarized to generate a plurality of pieces of binarized XZ image data, and area image data on an existing area of the sample is generated on the basis of the plurality of pieces of binarized XZ image data.

In this sample observation method, the planar light is applied on the XZ surface while the sample is scanned on the Y axis, and the plurality of pieces of XZ image data corresponding to the optical image of the observation light generated in the sample are acquired. Then, the observation image data is generated on the basis of the plurality of pieces of XZ image data, the information on the sample is extracted on the basis of the observation image data, and the analysis regarding the sample is executed. Here, in the sample observation method, when the observation image data is generated, the luminance image data on the luminance of the sample is generated on the basis of the plurality of pieces of XZ image data, the luminance values of each of the plurality of pieces of XZ image data are binarized to generate the plurality of pieces of binarized XZ image data, and the area image data on the existing area of the sample is generated on the basis of the plurality of pieces of binarized XZ image data. By performing the analysis using the necessary image data among the generated luminance image data and the area image data in this way, the amount of data to be processed can be significantly reduced, and the processing required from the acquisition of the XZ image data of the sample to the analysis of the sample can be speeded up.

In the analysis step, values of each of the plurality of pieces of binarized XZ image data constituting the area image data may be integrated in a Z-axis direction to generate thickness X image data, and pieces of the thickness X image data may be coupled in the Y-axis direction to generate thickness XY image data on a thickness of the sample. In this case, the information on the thickness of the sample can be efficiently acquired and analyzed.

In the analysis step, a top pixel position in a Z-axis direction from each of the plurality of pieces of binarized XZ image data constituting the area image data may be extracted to generate top position X image data, and pieces of the top position X image data may be coupled in the Y-axis direction to generate top position XY image data on a top position of the sample. In this case, in the analysis step, top luminance XY image data indicating a luminance value at the top position of the sample may be generated on the basis of the top position XY image data and the luminance image data. As a result, the information on the top position of the sample can be efficiently acquired and analyzed.

In the analysis step, a bottom pixel position in a Z-axis direction from each of the plurality of pieces of binarized XZ image data constituting the area image data may be extracted to generate bottom position X image data, and pieces of the bottom position X image data may be coupled in the Y-axis direction to generate bottom position XY image data on a bottom position of the sample. In this case, in the analysis step, bottom luminance XY image data indicating a luminance value at the bottom position of the sample may be generated on the basis of the bottom position XY image data and the luminance image data. As a result, the information on the bottom position of the sample can be efficiently acquired and analyzed.

In the analysis step, a specific pixel position in a Z-axis direction from each of the plurality of pieces of binarized XZ image data constituting the area image data may be extracted to generate specific position X image data, and pieces of the specific position X image data may be coupled in the Y-axis direction to generate specific position XY image data on a specific position of the sample. In this case, in the analysis step, specific luminance XY image data indicating a luminance value at the specific position of the sample may be generated on the basis of the specific position XY image data and the luminance image data. As a result, the information on the specific position of the sample can be efficiently acquired and analyzed.

In the analysis step, luminance values of each of the plurality of pieces of XZ image data constituting the luminance image data may be integrated in a Z-axis direction to generate integrated luminance X image data, and pieces of the integrated luminance X image data may be coupled in the Y-axis direction to generate integrated luminance XY image data on integrated luminance of the sample. In this case, in the integrated luminance X image data, the Z-axis direction component of the background light included in one pixel can be made constant, and thus the influence of variation in the luminance value of the background light can be reduced. Therefore, even in the integrated luminance XY image data obtained by coupling pieces of the integrated luminance X image data in the Y-axis direction, the influence of the background light can be sufficiently reduced.

In the analysis step, a maximum luminance value in a Z-axis direction from each of the plurality of pieces of XZ image data constituting the luminance image data may be extracted to generate maximum luminance X image data, and pieces of the maximum luminance X image data may be coupled in the Y-axis direction to generate maximum luminance XY image data on a maximum luminance value of the sample. In this case, the information on the distribution of the maximum luminance value of the sample in the Z-axis direction can be efficiently acquired and analyzed.

In the analysis step, a minimum luminance value in a Z-axis direction from each of the plurality of pieces of XZ image data constituting the luminance image data may be extracted to generate minimum luminance X image data, and pieces of the minimum luminance X image data may be coupled in the Y-axis direction to generate minimum luminance XY image data on a minimum luminance value of the sample. In this case, the information on the distribution of the minimum luminance value of the sample in the Z-axis direction can be efficiently acquired and analyzed.

In the image acquisition step, a plurality of pieces of the XZ image data corresponding to an optical image of the observation light having a plurality of wavelengths may be acquired, and in the image generation step, luminance image data on luminance of the sample may be generated on the basis of the plurality of pieces of XZ image data corresponding to an optical image of the observation light having one wavelength of the plurality of wavelengths, luminance values of each of the plurality of pieces of XZ image data corresponding to an optical image of the observation light having another wavelength of the plurality of wavelengths may be binarized to generate a plurality of pieces of binarized XZ image data, and area image data on an existing area of the sample may be generated on the basis of the plurality of pieces of binarized XZ image data. In this case, for example, area image data is generated using observation light having a wavelength at which it is easy to obtain the optical image, and the area image data on the existing area of the sample is generated, and thus it is possible to apply the information obtained from the area image data to the analysis in a case where the observation light having a wavelength at which it is difficult to obtain the optical image is used.

In the image acquisition step, a plurality of pieces of the XZ image data corresponding to an optical image of the observation light having a plurality of wavelengths may be acquired, and in the image generation step, luminance values of each of the plurality of pieces of XZ image data corresponding to an optical image of the observation light having one wavelength of the plurality of wavelengths may be binarized to generate a plurality of pieces of first binarized XZ image data, luminance image data on luminance of the sample may be generated on the basis of the first binarized XZ image data, luminance values of each of the plurality of pieces of XZ image data corresponding to an optical image of the observation light having another wavelength of the plurality of wavelengths may be binarized to generate a plurality of pieces of second binarized XZ image data, and area image data on an existing area of the sample may be generated on the basis of the plurality of pieces of second binarized XZ image data. In this case, for example, area image data is generated using observation light having a wavelength at which it is easy to obtain the optical image, and the area image data on the existing area of the sample is generated, and thus it is possible to apply the information obtained from the area image data to the analysis in a case where the observation light having a wavelength at which it is difficult to obtain the optical image is used.

Advantageous Effects of Invention

According to the present disclosure, it is possible to speed up the processing required for sample analysis.

BRIEF DESCRIPTION OF DRAWINGS

FIG. 1 is a schematic configuration view showing an embodiment of a sample observation device.

FIG. 14 is a schematic view showing an example of generation of observation image data based on XZ image data.

DESCRIPTION OF EMBODIMENTS

Figure 2:
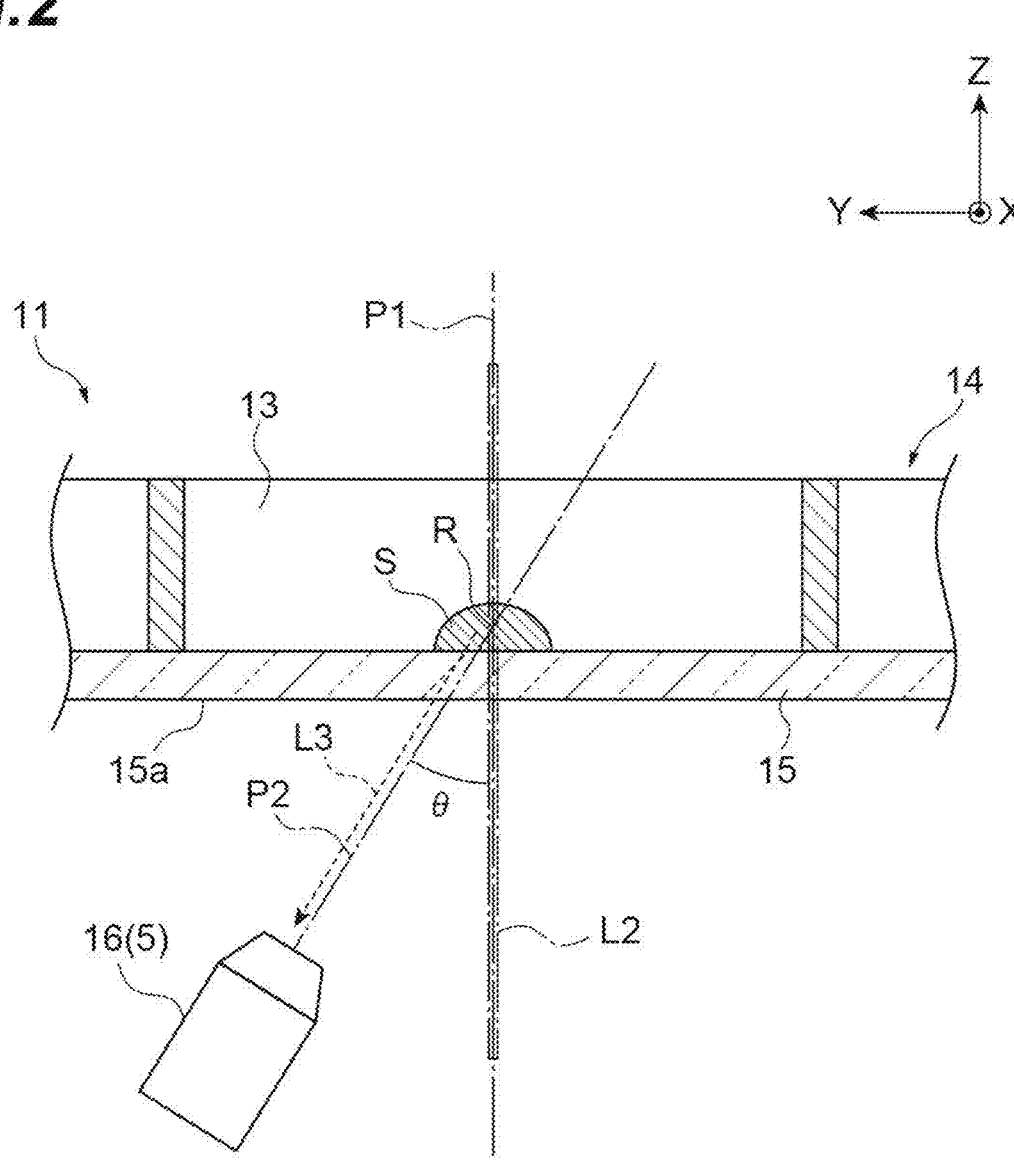
FIG. 2 is an enlarged view of a main part showing the vicinity of a sample.

Hereinafter, preferred embodiments of a sample observation device and a sample observation method according to an aspect of the present disclosure will be described in detail with reference to the drawings.

Figure 1:
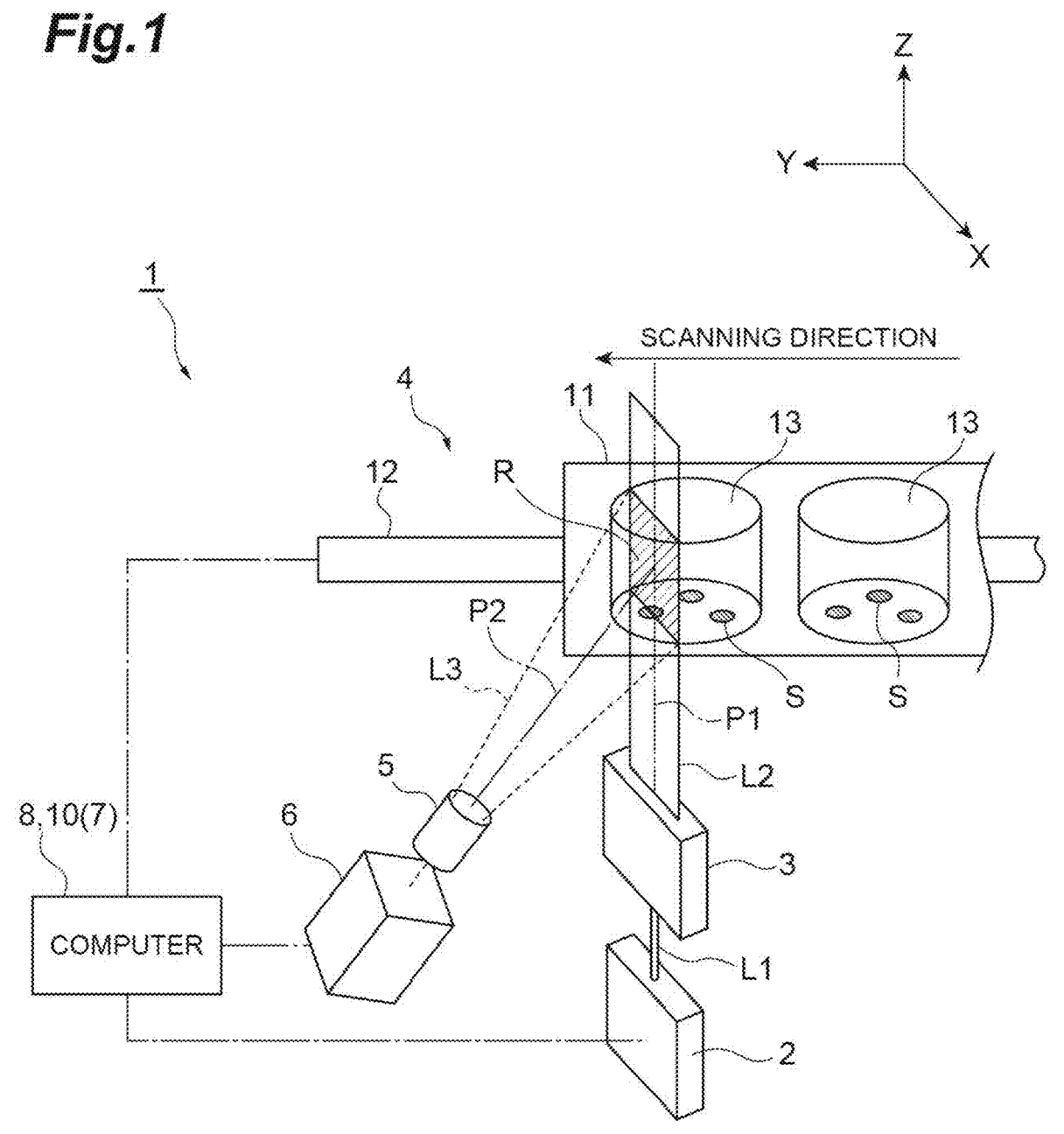

FIG. 1 is a schematic configuration view showing an embodiment of a sample observation device. This sample observation device 1 is a device that irradiates the sample S with planar light L2, images observation light (for example, fluorescence or scattered light) generated inside the sample S on an imaging surface, and acquires observation image data of the inside of the sample S. As this type of sample observation device 1, there is a slide scanner that acquires an image of the sample S held on a slide glass and displays the image, a plate reader that acquires image data of the sample S held on a microplate and analyzes the image data, or the like. As shown in FIG. 1, the sample observation device 1 includes a light source 2, an irradiation optical system 3, a scanning unit 4, an imaging optical system 5, an image acquisition unit 6, and a computer 7.

Examples of the sample S to be observed include cells, tissues, and organs of humans or animals, animals or plants themselves, cells and tissues of plants, and the like. These samples S are stained with a fluorescent material such as fluorescein-dextran (excitation wavelength: 494 nm/fluorescence wavelength: 521 nm) and tetramethylrhodamine (excitation wavelength: 555 nm/fluorescence wavelength: 580 nm). The sample S may be stained with a plurality of fluorescent substances. Further, the sample S may be contained in a solution, a gel, or a substance having a refractive index different from that of the sample S.

The light source 2 is a light source that outputs light L1 that is applied to the sample S. Examples of the light source 2 include a laser light source such as a laser diode and a solid-state laser light source. Further, the light source 2 may be a light emitting diode, a super luminescent diode, or a lamp-based light source. The light L1 output from the light source 2 is guided to the irradiation optical system 3.

The irradiation optical system 3 is an optical system that shapes the light L1 output from the light source 2 into planar light L2 and irradiates the sample S with the shaped planar light L2 along an optical axis P1. In the following description, the optical axis P1 of the irradiation optical system 3 may be referred to as an optical axis of the planar light L2. The irradiation optical system 3 includes, for example, an optical shaping element such as a cylindrical lens, an axicon lens, or a spatial light modulator and is optically coupled to the light source 2. The irradiation optical system 3 may be configured to include an objective lens. The planar light L2 formed by the irradiation optical system 3 is applied to the sample S. In the sample S irradiated with the planar light L2, observation light L3 is generated on an irradiation surface R of the planar light L2. The observation light L3 is, for example, fluorescence excited by the planar light L2, scattered light of the planar light L2, or diffusely reflected light of the planar light L2.

In a case where observation of the sample S in the thickness direction is performed, the planar light L2 is preferably a thin planar light having a thickness of 2 mm or less in consideration of a resolution. Further, in a case where the thickness of the sample S is very small, that is, in a case where the sample S having a thickness equal to or lower than a Z-direction resolution, which will be described later, is observed, the thickness of the planar light L2 does not affect the resolution. Therefore, planar light L2 having a thickness of more than 2 mm may be used.

The scanning unit 4 is a mechanism for scanning the sample S with respect to the irradiation surface R of the planar light L2. In the present embodiment, the scanning unit 4 is constituted by a moving stage 12 for moving a sample container 11 holding the sample S. The sample container 11 is, for example, a microplate, a slide glass, a Petri dish, or the like and has transparency with respect to the planar light L2 and the observation light L3. In the present embodiment, a microplate is illustrated. As shown in FIG. 2, the sample container 11 has a plate-shaped main body 14 in which a plurality of wells 13 in which the sample S is disposed are arranged in a straight line (or a matrix shape) and a plate-shaped transparent member 15 provided to close one end side of the well 13 on one surface side of the main body 14.

When the sample S is disposed in the well 13, the well 13 is filled with a solution such as a culture solution, a fluorescence indicator, and a buffer together with the sample S. The solution emits autofluorescence. The transparent member 15 has an input surface 15a of the planar light L2 with respect to the sample S disposed in the well 13. The material of the transparent member 15 is not particularly limited as long as it is a member having transparency to the planar light L2 and is, for example, glass, quartz, or a synthetic resin. The sample container 11 is disposed with respect to the moving stage 12 such that the input surface 15a is orthogonal to the optical axis P1 of the planar light L2. The other end side of the well 13 opens to the outside. The sample container 11 may be fixed to the moving stage 12.

As shown in FIG. 1, the moving stage 12 scans the sample container 11 in a preset direction in response to a control signal from the computer 7. In the present embodiment, the moving stage 12 scans the sample container 11 in one direction in a plane orthogonal to the optical axis P1 of the planar light L2. In the following description, a direction of the optical axis P1 of the planar light L2 is referred to as a Z axis, a scanning direction of the sample container 11 due to the moving stage 12 is referred to as a Y axis, and a direction orthogonal to the Y axis in a plane orthogonal to the optical axis P1 of the planar light L2 is referred to as the X axis. The irradiation surface R of the planar light L2 with respect to the sample S is a surface in an XZ plane.

The imaging optical system 5 is an optical system that images the observation light L3 generated in the sample S by irradiation with the planar light L2. As shown in FIG. 2, the imaging optical system 5 includes, for example, an objective lens 16. An optical axis of the imaging optical system 5 is an observation axis P2 of the observation light L3. The observation axis P2 of the imaging optical system 5 is inclined with an inclination angle θ with respect to the irradiation surface R of the planar light L2 in the sample S. The inclination angle θ also coincides with an angle formed by the optical axis P1 of the planar light L2 and the observation axis P2 toward the sample S. The inclination angle θ is, for example, 10° to 80°. From the viewpoint of improving the resolution of an observation image, the inclination angle θ is preferably 20° to 70°. Further, from the viewpoint of improving the resolution of the observation image and the stability of the visual field, the inclination angle θ is more preferably 30° to 65°.

As shown in FIG. 1, the image acquisition unit 6 is a portion that acquires a plurality of pieces of XZ image data corresponding to an optical image of the observation light L3 imaged by the imaging optical system 5. The image acquisition unit 6 includes, for example, an image pickup device that captures an optical image of the observation light L3. Examples of the image pickup device include area image sensors such as a CMOS image sensor and a CCD image sensor. These area image sensors are disposed on an imaging surface of the imaging optical system 5 and capture an optical image by, for example, a global shutter or a rolling shutter. The area image sensor acquires a plurality of pieces of XZ image data 21 (see FIG. 3), which is data of the two-dimensional image of the sample S, in a Y-axis direction and outputs the data to the computer 7.

The computer 7 physically includes a memory such as RAM and ROM, a processor (an arithmetic circuit) such as a CPU, a communication interface, a storage unit such as a hard disk, and a display unit such as a display. Examples of such a computer 7 include a personal computer, a cloud server, a smart device (a smartphone, a tablet terminal, or the like), and the like. The computer 7 functions as a controller that controls the operations of the light source 2 and the moving stage 12, an image generation unit 8 that generates observation image data of the sample S, and an analysis unit 10 that performs analysis of the sample S on the basis of the observation image data by causing a CPU of a computer system to execute a program stored in a memory.

The computer 7 serving as the controller receives an input of a measurement start operation from a user and drives the light source 2, the moving stage 12, and the image acquisition unit 6 in synchronization with each other. In this case, the computer 7 may control the light source 2 such that the light source 2 continuously outputs the light L1 while the sample S is being moved by the moving stage 12 and may control the ON/OFF of the output of the light L1 from the light source 2 in accordance with the imaging of the image acquisition unit 6. Further, when the irradiation optical system 3 is provided with an optical shutter (not shown), the computer 7 may control the ON/OFF of the irradiation of the sample S with the planar light L2 by controlling the optical shutter.

Further, the computer 7 serving as the image generation unit 8 generates the observation image data of the sample S on the basis of the plurality of pieces of XZ image data 21 generated by the image acquisition unit 6. Specifically, when the image generation unit 8 receives the plurality of pieces of XZ image data 21 output from the image acquisition unit 6, the image generation unit 8 generates two types of data, that is, luminance image data 31 and area image data 32 as the observation image data 23 of the sample S on the basis of the plurality of pieces of XZ image data 21.

Figure 3:
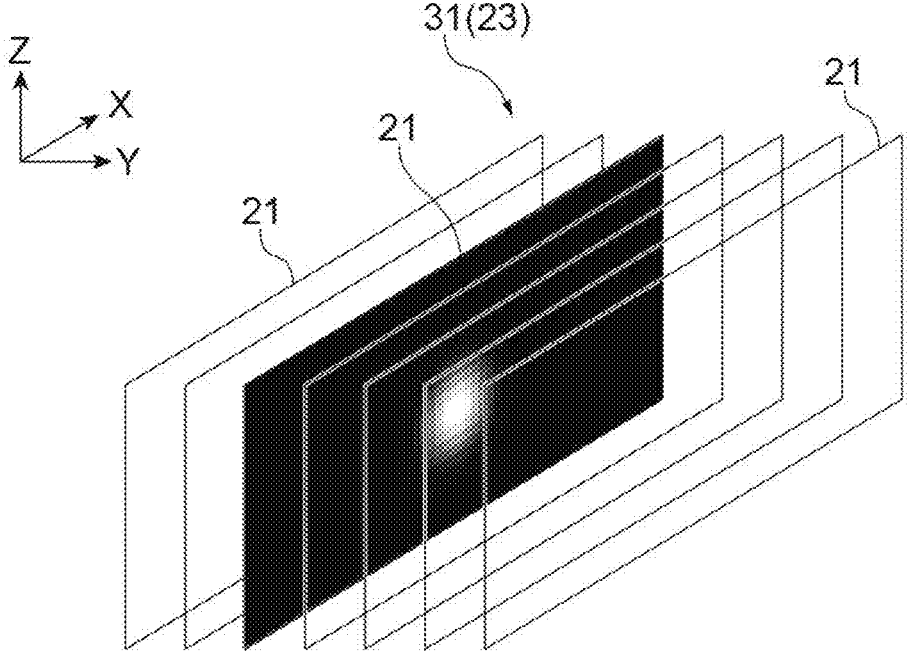
FIG. 3 is a schematic view showing a state of generation of luminance image data.

In generating the luminance image data 31, as shown in FIG. 3, the image generation unit 8 generates the luminance image data 31 by combining the plurality of pieces of XZ image data 21 as a set. The luminance image data 31 has information on three-dimensional luminance distribution of the sample S. The image generation unit 8 outputs the generated luminance image data 31 to the analysis unit 10.

In generating the luminance image data 31, the image generation unit 8 may execute the processing of removing a luminance value of background light (here, a luminance value caused by the solution in the well 13 in which the sample S is disposed). In this case, the image generation unit 8 specifies a luminance area corresponding to the sample S in each of pieces of the XZ image data 21 and sets values of pixels constituting an area other than the specified luminance area to 0 to remove the luminance value of the background light. Further, the image generation unit 8 may execute the processing of subtracting the luminance value of the background light in generating the luminance image data 31. In this case, the luminance value of the background light is subtracted from the values of the pixels constituting the area other than the luminance area in each of pieces of the XZ image data 21. In a case where the processing of removing or subtracting the influence of the background light is executed, the observation light L3 from the sample S can be measured with high reproducibility.

Figure 4:
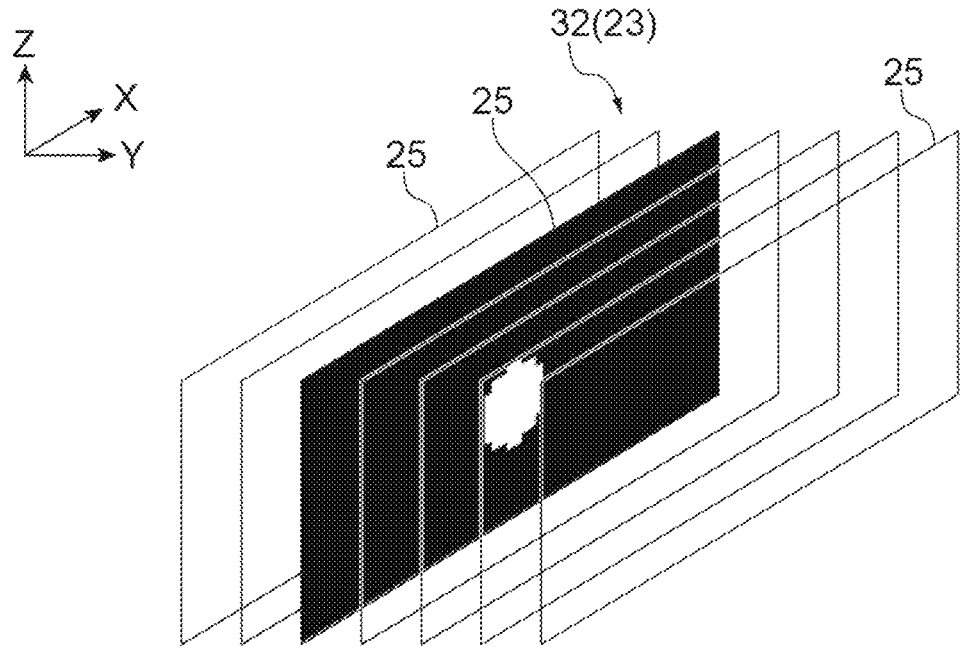
FIG. 4 is a schematic view showing a state of generation of area image data.

In generating the area image data 32, as shown in FIG. 4, the image generation unit 8 binarizes the luminance values of each of the plurality of pieces of XZ image data 21 to generate the plurality of pieces of binarized XZ image data 25. In the binarization of the luminance values, for example, the image generation unit 8 has a threshold value of the luminance value in advance for each type of the sample S, sets a pixel value of a pixel having a pixel value equal to or higher than the threshold value to 1, and sets a pixel value of a pixel having a pixel value lower than the threshold value to 0 to generate the binarized XZ image data 25. With the binarization of the luminance values, the binarized XZ image data 25 is data indicating that the sample S exists in the area where the pixel value of the pixel is 1 and the sample S does not exist in the area where the pixel value of the pixel is 0. The image generation unit 8 generates the area image data 32 by combining these plurality of pieces of binarized XZ image data 25 as a set. This area image data 32 has information on a three-dimensional existing area of the sample S. The image generation unit 8 outputs the generated area image data 32 to the analysis unit 10. In generating the area image data 32, the luminance values of each of the plurality of pieces of XZ image data 21 may be multi-valued to generate the plurality of pieces of binarized XZ image data 25.

The computer 7 serving as the analysis unit 10 executes analysis of the sample S on the basis of the observation image data 23 generated by the image generation unit 8 and generates an analysis result. Specifically, the analysis unit 10 extracts area information and luminance information of the sample S on the basis of the luminance image data 31 and/or the area image data 32 received from the image generation unit 8. Here, in extracting the area information and the luminance information, the analysis unit 10 extracts information including at least one of a thickness of the sample S in a Z-axis direction, a top position of the sample S in the Z-axis direction, luminance at the top position of the sample S in the Z-axis direction, a bottom position of the sample S in the Z-axis direction, luminance at the bottom position of the sample S in the Z-axis direction, a specific position of the sample S in the Z-axis direction, luminance at the specific position of the sample S in the Z-axis direction, integrated luminance of the sample S in the Z-axis direction, the maximum luminance of the sample S in the Z-axis direction, the minimum luminance of the sample S in the Z-axis direction on the basis of the luminance image data 31 and/or the area image data 32.

Figure 5:
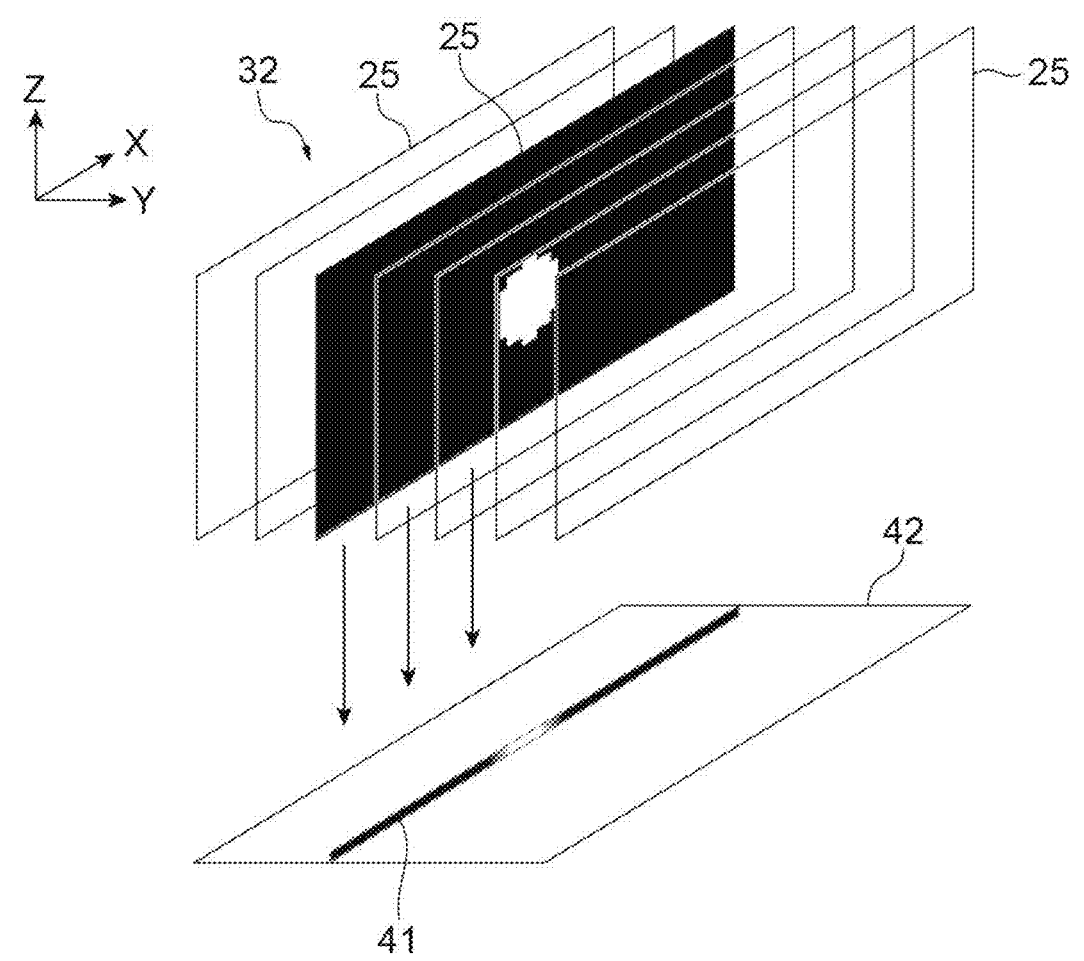
FIG. 5 is a schematic view showing a state of generation of thickness XY image data.
Figure 5:
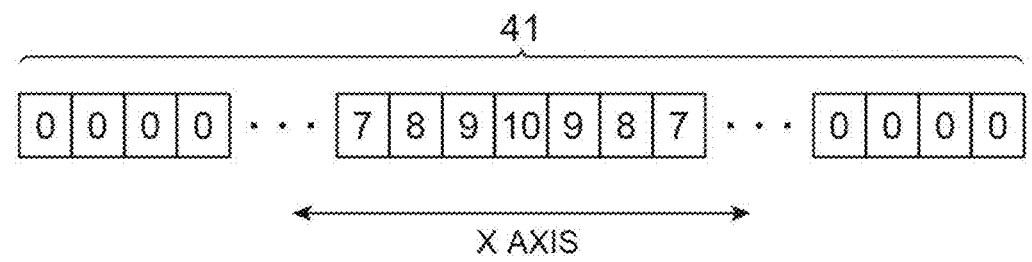

In a case where the analysis unit 10 extracts the information on the thickness of the sample S in the Z-axis direction, first, as shown in FIG. 5(*a*), the analysis unit 10 integrates the pixel values of each of the plurality of pieces of binarized XZ image data 25 in the Z-axis direction to generate thickness X image data 41. As shown in FIG. 5(*b*), each pixel of the thickness X image data 41 includes an integrated value of the pixel values in the Z-axis direction. In the example of FIG. 5, each pixel of the thickness X image data 41 has the integrated value in a state where the central pixel value in an X-axis direction is 10, the pixel values on both sides thereof are 9, and so on.

In the binarized XZ image data 25, the value of the pixel at a position where the sample S exists is 1, and the value of the pixel at a position where the sample S does not exist is 0. Therefore, the integrated value of each pixel in the thickness X image data 41 indicates the existing area of the sample S in the Z-axis direction in the coordinates of the pixel in the X-axis direction (that is, the thickness of the sample S in the Z-axis direction). If information on an actual thickness per pixel is obtained, the thickness of the sample S in the Z-axis direction can be obtained by multiplying the integrated value of each pixel by the thickness per pixel. In the thickness XY image data 42 obtained by coupling these pieces of thickness X image data 41 in the Y-axis direction, the information on the thickness of the sample S in each XY plane is the pixel value, and thus the thickness of the sample S in the Z-axis direction is represented as a contour line.

Figure 6:
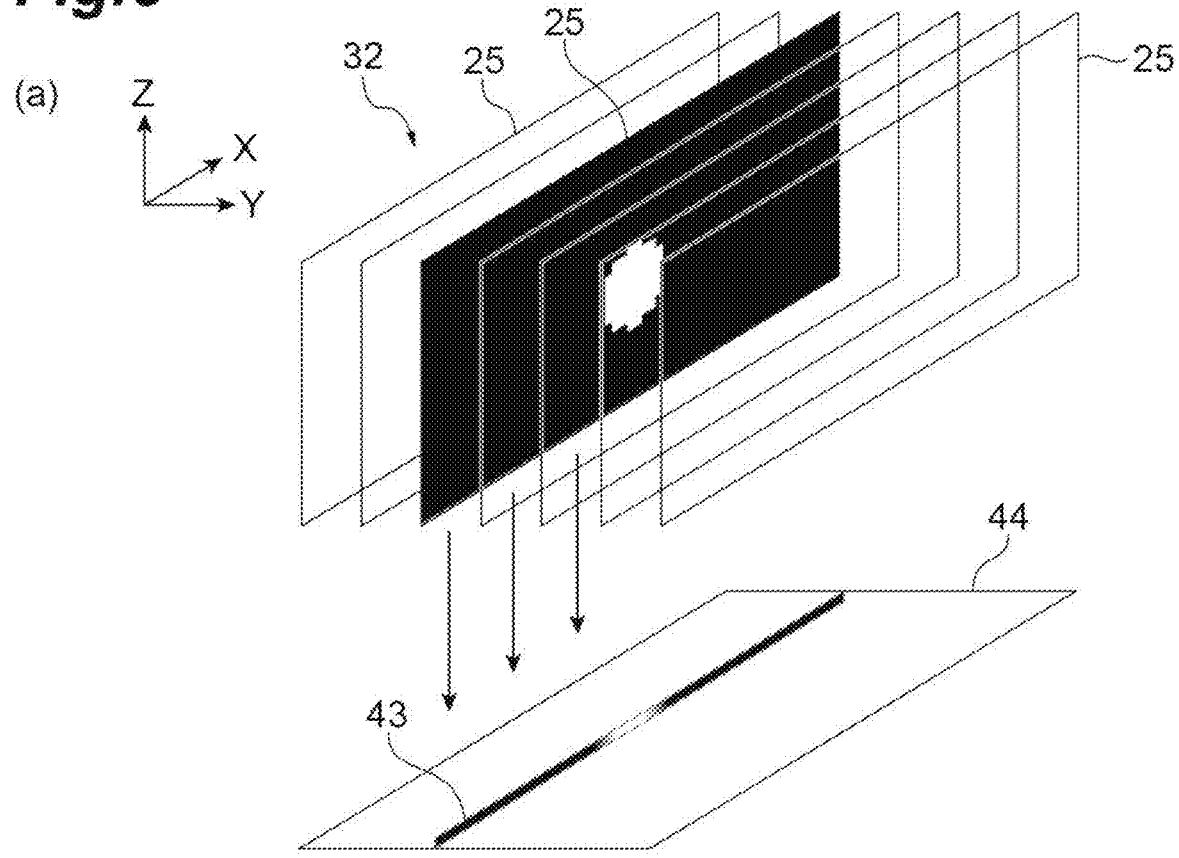
FIG. 6 is a schematic view showing a state of generation of top position XY image data and top luminance XY image data.
Figure 6:
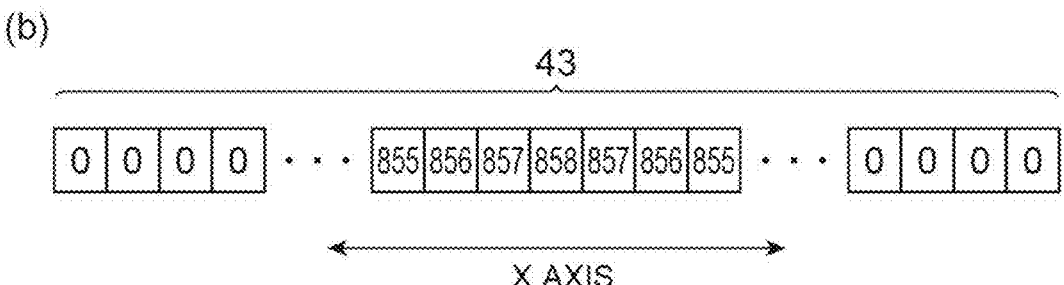
Figure 6:
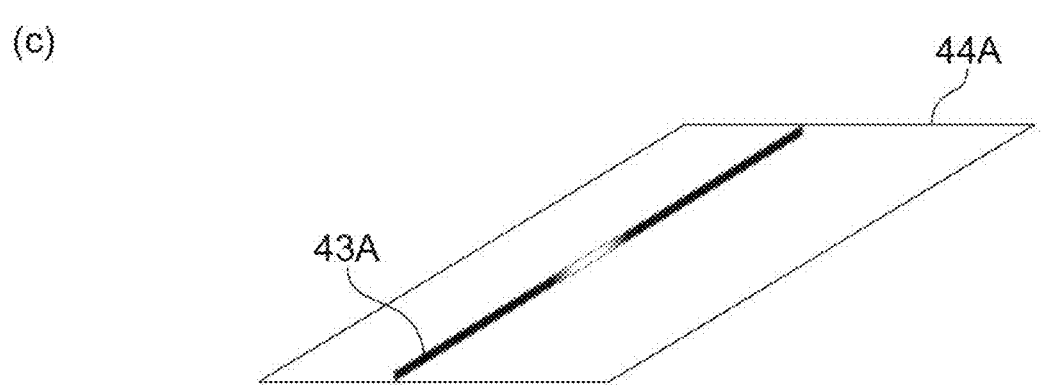

In a case where the analysis unit 10 extracts the information on the top position of the sample S in the Z-axis direction, first, as shown in FIG. 6(*a*), the analysis unit 10 refers to the plurality of pieces of binarized XZ image data 25 and extracts a coordinate value (a top pixel position) of the pixel having the largest coordinate value in the Z-axis direction among the pixels having the pixel value of 1 as the top position of the sample S in the Z-axis direction. In the example of FIG. 6(*a*), the binarized XZ image data 25 has 1024 pixels in the Z-axis direction, and coordinate values from 1 to 1024 are assigned in order from the lower pixel. The analysis unit 10 detects the pixel value in the Z-axis direction at each coordinate of the binarized XZ image data 25 in the X-axis direction. Then, the coordinate value of the pixel having the largest coordinate value among the pixels having the pixel value of 1 or more is extracted to generate top position X image data 43.

In a case where the luminance values of each of the plurality of pieces of XZ image data 21 are multi-valued to obtain the plurality of pieces of binarized XZ image data 25, the pixel having the pixel value of 1 or more in the plurality of pieces of binarized XZ image data 25 indicates a pixel in which the sample S exists. Therefore, a coordinate value (a top pixel position) of the pixel having the largest coordinate value in the Z-axis direction among pixels having the pixel value of 1 or more may be extracted as the top position of the sample S in the Z-axis direction.

As shown in FIG. 6(*b*), each pixel of the top position X image data 43 includes the coordinate value of the pixel having the largest coordinate value among the pixels having the pixel value of 1 or more. In the example of FIG. 6(*b*), each pixel of the top position X image data 43 has the coordinate value in a state where the central pixel value in the X-axis direction is 858, the pixel values on both sides thereof are 857, and so on. The analysis unit 10 generates the top position X image data 43 for each of pieces of the binarized XZ image data 25 and couples pieces of the top position X image data 43 in the Y-axis direction to generate top position XY image data 44, as shown in FIG. 6(*a*).

The analysis unit 10 may generate top luminance XY image data 44A indicating the luminance value at the top position of the sample S on the basis of the top position XY image data 44 and the luminance image data 31 (see FIG. 3), as shown in FIG. 6(*c*). In this case, the analysis unit 10 extracts the luminance value corresponding to the pixel value (the coordinate value) of the top position XY image data 44 from the luminance value included in each pixel of the luminance image data 31 to generate the top luminance XY image data 44A. In generating the top luminance XY image data 44A, first, the analysis unit 10 may extract the luminance value corresponding to the pixel value (the coordinate value) of the top position X image data 43 from the luminance value included in each pixel of the luminance image data 31 to generate top luminance X image data 43A (see FIG. 6(*c*)). In this case, it is possible to generate the top luminance XY image data 44A by coupling pieces of the top luminance X image data 43A in the Y-axis direction. The analysis unit 10 analyzes the top position XY image data 44 or the top luminance XY image data 44A to extract the top position of the sample S in the Z-axis direction and the luminance at the top position of the sample S in the Z-axis direction.

Figure 7:
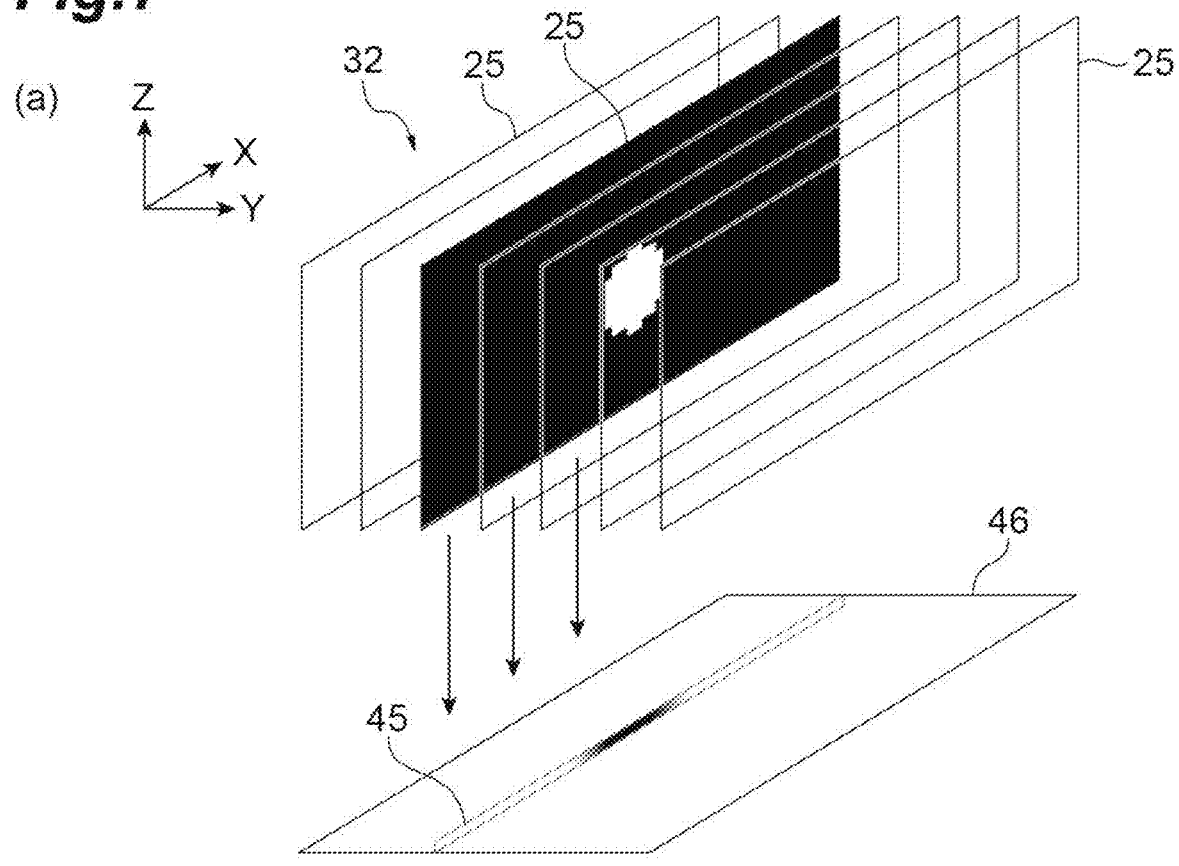
FIG. 7 is a schematic view showing a state of generation of bottom position XY image data and bottom luminance XY image data.
Figure 7:
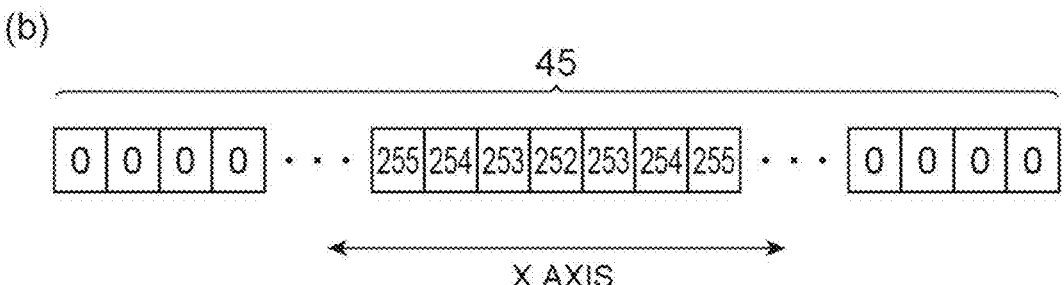
Figure 7:
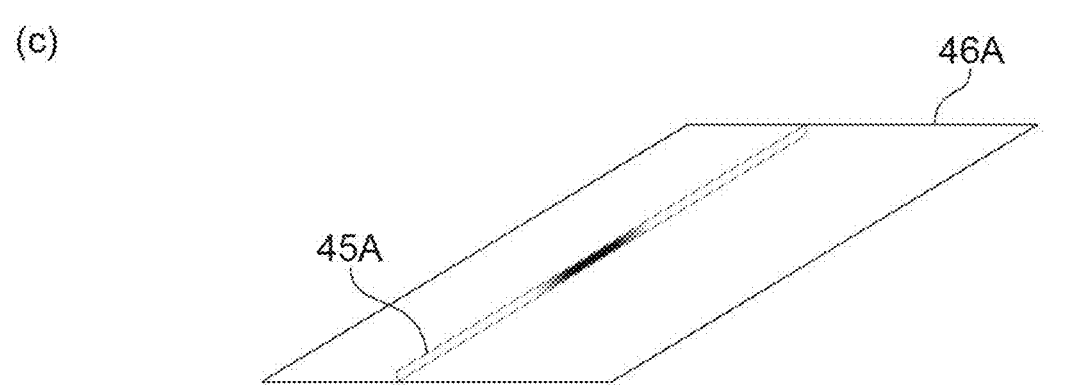

In a case where the analysis unit 10 extracts the information on the bottom position of the sample S in the Z-axis direction, first, as shown in FIG. 7(*a*), the analysis unit 10 refers to the plurality of pieces of binarized XZ image data 25 and extracts a coordinate value (a bottom pixel position) of the pixel having the smallest coordinate value in the Z-axis direction among the pixels having the pixel value of 1 as the bottom position of the sample S in the Z-axis direction. In the example of FIG. 7(*a*), similarly to FIG. 6(*a*), the binarized XZ image data 25 has 1024 pixels in the Z-axis direction, and coordinate values from 1 to 1024 are assigned in order from the lower pixel. The analysis unit 10 detects the pixel value in the Z-axis direction at each coordinate of the binarized XZ image data 25 in the X-axis direction. Then, the coordinate value of the pixel having the smallest coordinate value among the pixels having the pixel value of 1 or more is extracted to generate bottom position X image data 45.

In a case where the luminance values of each of the plurality of pieces of XZ image data 21 are multi-valued to obtain the plurality of pieces of binarized XZ image data 25, the pixel having the pixel value of 1 or more in the plurality of pieces of binarized XZ image data 25 indicates a pixel in which the sample S exists. Therefore, a coordinate value (a bottom pixel position) of the pixel having the smallest coordinate value in the Z-axis direction among pixels having the pixel value of 1 or more may be extracted as the bottom position of the sample S in the Z-axis direction.

As shown in FIG. 7(*b*), each pixel of the bottom position X image data 45 includes the coordinate value of the pixel having the smallest coordinate value among the pixels having the pixel value of 1 or more. In the example of FIG. 7(*b*), each pixel of the bottom position X image data 45 has the coordinate value in a state where the central pixel value in the X-axis direction is 252, the pixel values on both sides thereof are 253, and so on. The analysis unit 10 generates the bottom position X image data 45 for each of pieces of the binarized XZ image data 25 and couples pieces of the bottom position X image data 45 in the Y-axis direction to generate bottom position XY image data 46, as shown in FIG. 7(*a*).

The analysis unit 10 may generate bottom luminance XY image data 46A indicating the luminance value at the bottom position of the sample S on the basis of the bottom position XY image data 46 and the luminance image data 31 (see FIG. 3), as shown in FIG. 7(*c*). In this case, the analysis unit 10 extracts the luminance value corresponding to the pixel value (the coordinate value) of the bottom position XY image data 46 from the luminance value included in each pixel of the luminance image data 31 to generate the bottom luminance XY image data 46A. In generating the bottom luminance XY image data 46A, first, the analysis unit 10 may extract the luminance value corresponding to the pixel value (the coordinate value) of the bottom position X image data 45 from the luminance value included in each pixel of the luminance image data 31 to generate bottom luminance X image data 45A (see FIG. 7(*c*)). In this case, it is possible to generate the bottom luminance XY image data 46A by coupling pieces of the bottom luminance X image data 45A in the Y-axis direction. The analysis unit 10 analyzes the bottom position XY image data 46 or the bottom luminance XY image data 46A to extract the bottom position of the sample S in the Z-axis direction and the luminance at the bottom position of the sample S in the Z-axis direction.

Figure 8:
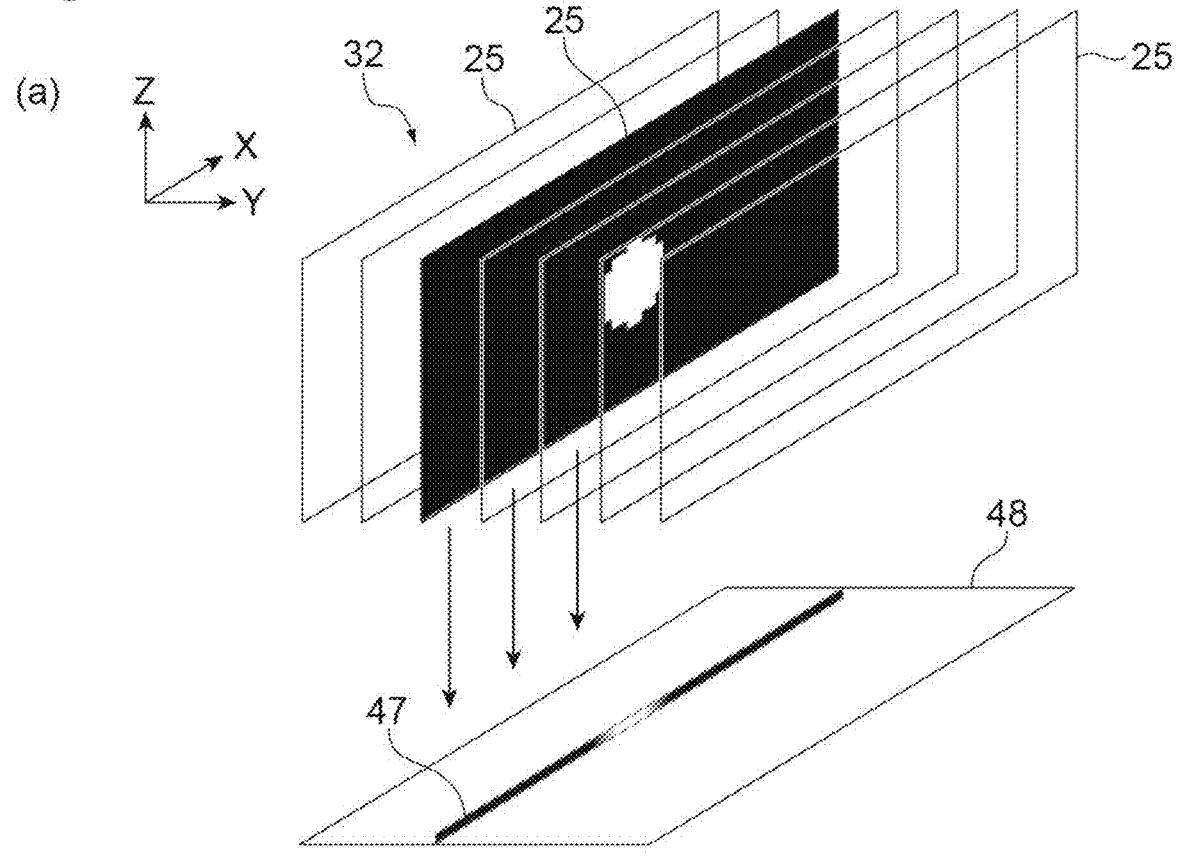
FIG. 8 is a schematic view showing a state of generation of a specific position XY image data and a specific luminance XY image data.
Figure 8:
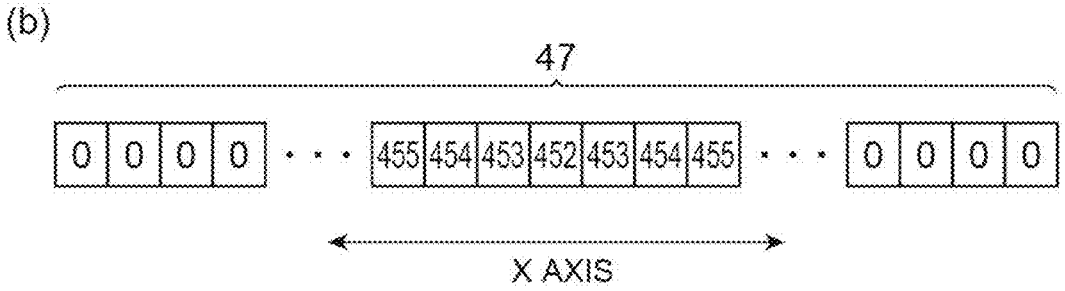
Figure 8:
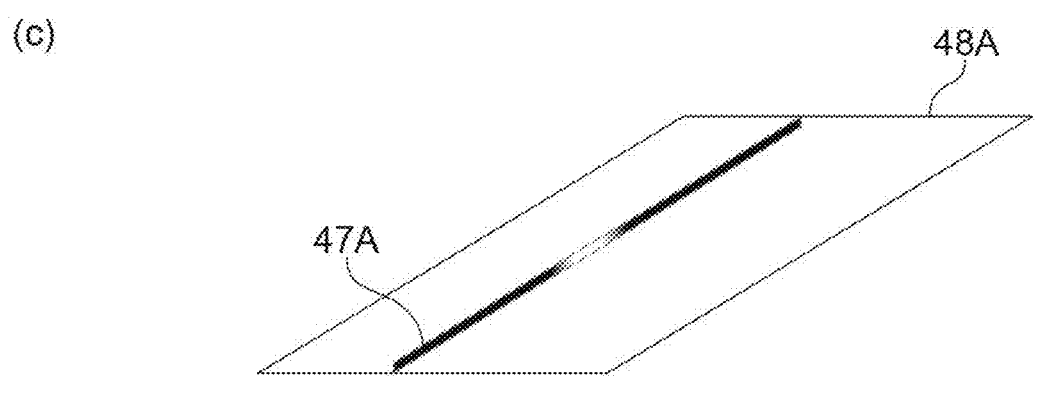

In a case where the analysis unit 10 extracts the information on the specific position of the sample S in the Z-axis direction, first, as shown in FIG. 8(*a*), the analysis unit 10 refers to the plurality of pieces of binarized XZ image data 25 and extracts a coordinate value (a pixel position) of a specific pixel in the Z-axis direction as the specific position of the sample S in the Z-axis direction. Here, a position that is a 200th pixel from the bottom position toward the top position is set as the specific position. The analysis unit 10 detects the pixel value in the Z-axis direction at each coordinate of the binarized XZ image data 25 in the X-axis direction. Then, a coordinate value of the pixel that is the 200th pixel from the bottom position is extracted to generate specific position X image data 47.

As shown in FIG. 8(*b*), each pixel of the specific position X image data 47 includes the coordinate value of the pixel that is the 200th pixel from the bottom position toward the top position. In the example of FIG. 8(*b*), each pixel of the specific position X image data 47 has the coordinate value in a state where the central pixel value in the X-axis direction is 452, the pixel values on both sides thereof are 453, and so on. The analysis unit 10 generates the specific position X image data 47 for each of pieces of the binarized XZ image data 25 and couples pieces of the specific position X image data 47 in the Y-axis direction to generate specific position XY image data 48, as shown in FIG. 8(*a*).

The analysis unit 10 may generate specific luminance XY image data 48A indicating the luminance value at the specific position of the sample S on the basis of the specific position XY image data 48 and the luminance image data 31 (see FIG. 3), as shown in FIG. 8(*c*). In this case, the analysis unit 10 extracts the luminance value corresponding to the pixel value (the coordinate value) of the specific position XY image data 48 from the luminance value included in each pixel of the luminance image data 31 to generate the specific luminance XY image data 48A. In generating the specific luminance XY image data 48A, first, the analysis unit 10 may extract the luminance value corresponding to the pixel value (the coordinate value) of the specific position X image data 47 from the luminance value included in each pixel of the luminance image data 31 to generate specific luminance X image data 47A (see FIG. 8(*c*)). In this case, it is possible to generate the specific luminance XY image data 48A by coupling pieces of the specific luminance X image data 47A in the Y-axis direction. The analysis unit 10 analyzes the specific position XY image data 48 or the specific luminance XY image data 48A to extract the specific position of the sample S in the Z-axis direction and the luminance at the specific position of the sample S in the Z-axis direction.

There is no particular limitation on the setting of the specific position, and the setting is not limited to the setting with the bottom position as a reference as described above. For example, the setting with the top position as a reference, the setting with a position at the center between the top position and the bottom position (a thickness center) as a reference, or the like may be adopted. Further, the same coordinates in the Z-axis direction may be set as the specific position. Further, the position of the pixel separated in the Z-axis direction by the number of pixels corresponding to a predetermined proportion of a thickness from the reference such as the top position, the bottom position, or the thickness center may be set as the specific position. When the specific position is set, image data obtained under other measurement conditions (for example, measurement with excitation light having another excitation wavelength) may be referred to.

Figure 9:
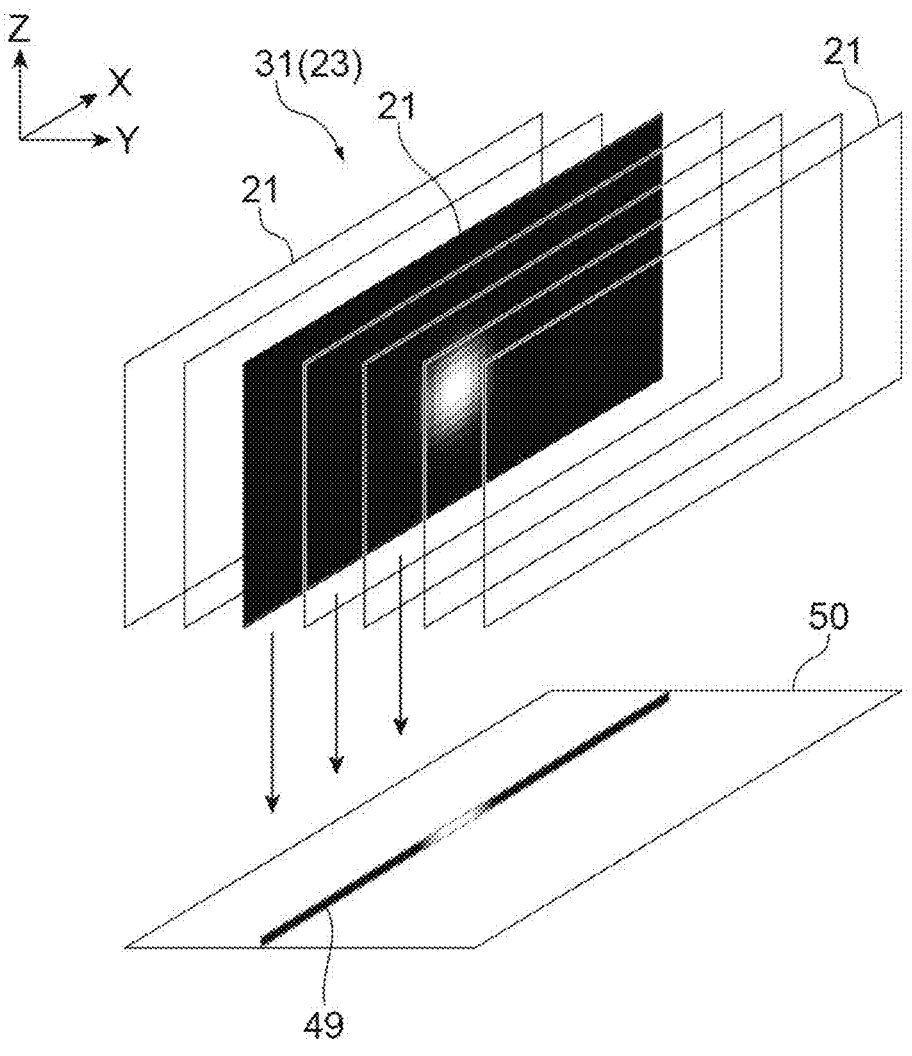
FIG. 9 is a schematic view showing a state of generation of integrated luminance XY image data.

In a case where the analysis unit 10 extracts the information on the integrated luminance of the sample S in the Z-axis direction, first, as shown in FIG. 9, the analysis unit 10 integrates the luminance values of each of the plurality of pieces of XZ image data 21 in the Z-axis direction to generate integrated luminance X image data 49. Next, integrated luminance XY image data 50 is generated by pieces of the generated integrated luminance X image data 49 being coupled in the Y-axis direction. The analysis unit 10 analyzes the integrated luminance XY image data 50 to extract the integrated luminance of the sample S in the Z-axis direction.

Figure 10:
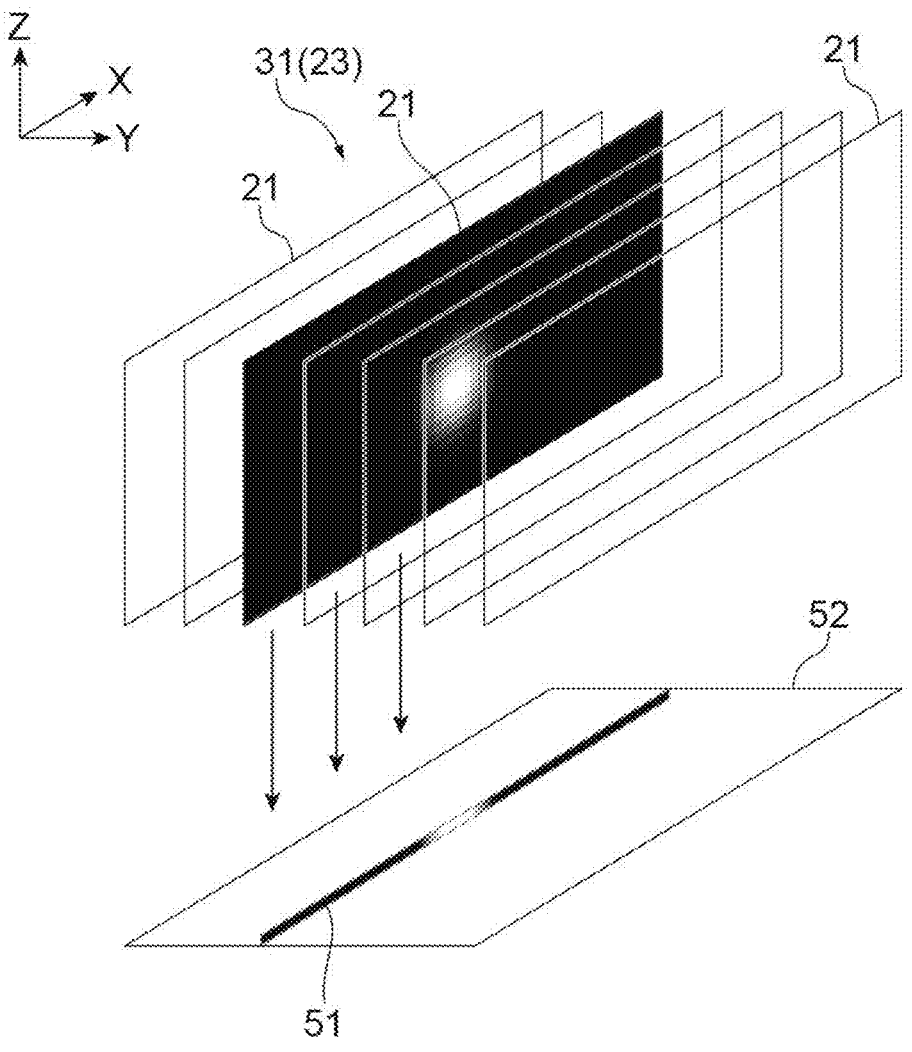
FIG. 10 is a schematic view showing a state of generation of the maximum luminance XY image data.

In a case where the analysis unit 10 extracts the information on the maximum luminance of the sample S in the Z-axis direction, as shown in FIG. 10, the analysis unit 10 detects the luminance value in the Z-axis direction at each coordinate of the plurality of pieces of XZ image data 21 in the X-axis direction and extracts the luminance value (the maximum luminance value) of the pixel having the largest luminance value in the Z-axis direction to generate the maximum luminance X image data 51. Next, the maximum luminance XY image data 52 is generated by pieces of the generated maximum luminance X image data 51 being coupled in the Y-axis direction. The analysis unit 10 analyzes the maximum luminance XY image data 52 to extract the maximum luminance of the sample S in the Z-axis direction.

Figure 11:
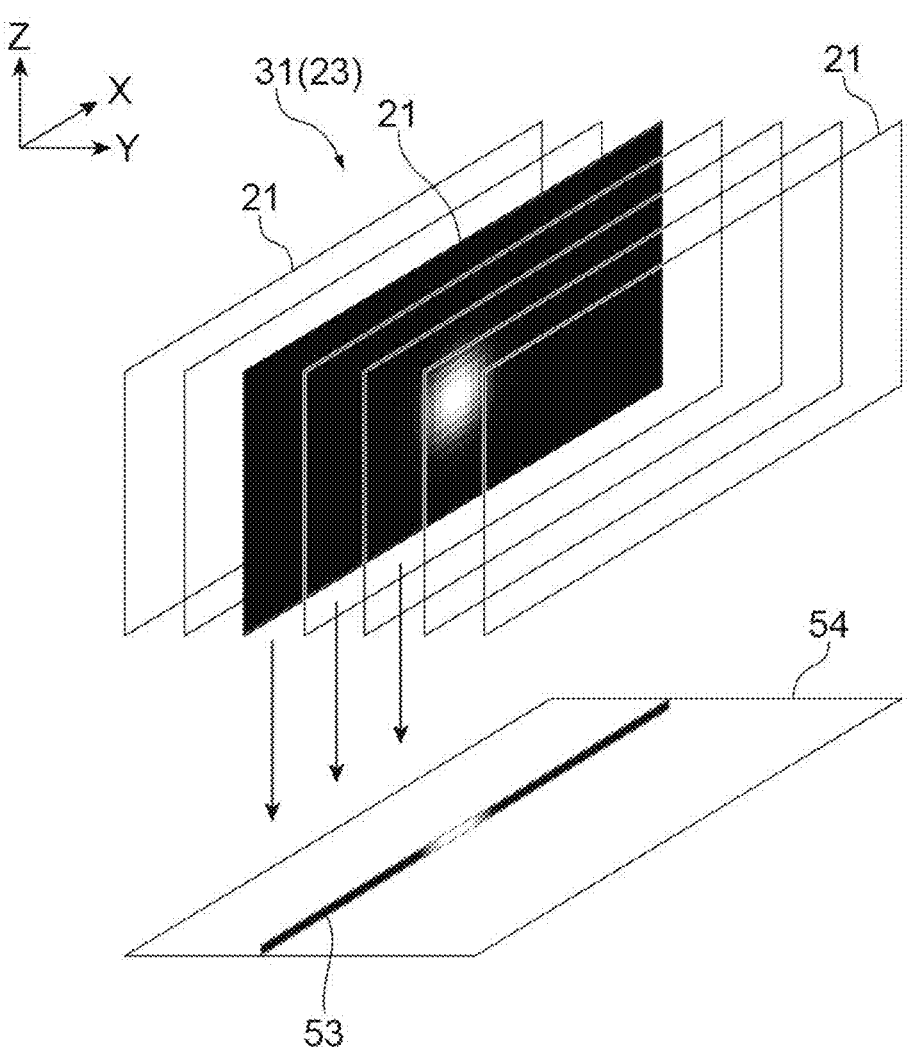
FIG. 11 is a schematic view showing a state of generation of the minimum luminance XY image data.

In a case where the analysis unit 10 extracts the information on the minimum luminance of the sample S in the Z-axis direction, as shown in FIG. 11, the analysis unit 10 detects the luminance value in the Z-axis direction at each coordinate of the plurality of pieces of XZ image data 21 in the X-axis direction and extracts the luminance value (the minimum luminance value) of the pixel having the smallest luminance value in the Z-axis direction to generate the minimum luminance X image data 53. Next, the minimum luminance XY image data 54 is generated by pieces of the generated minimum luminance X image data 53 being coupled in the Y-axis direction. The analysis unit 10 analyzes the minimum luminance XY image data 54 to extract the minimum luminance of the sample S in the Z-axis direction.

The analysis unit 10 analyzes a feature amount for each sample S on the basis of at least one of a thickness of the sample S extracted in a Z-axis direction in this way, a top position of the sample S in the Z-axis direction, luminance at the top position of the sample S in the Z-axis direction, a bottom position of the sample S in the Z-axis direction, luminance at the bottom position of the sample S in the Z-axis direction, a specific position of the sample S in the Z-axis direction, luminance at the specific position of the sample S in the Z-axis direction, integrated luminance of the sample S in the Z-axis direction, the maximum luminance of the sample S in the Z-axis direction, the minimum luminance of the sample S in the Z-axis direction and performs storage of the analysis result, display of the analysis result on a monitor or the like, and the like. It is not necessarily have to perform the display of various pieces of the image data generated by the analysis unit 10 on a monitor or the like, and only the analysis result of the feature amount for each sample S in the analysis unit 10 may be displayed on a monitor or the like.

Figure 12:
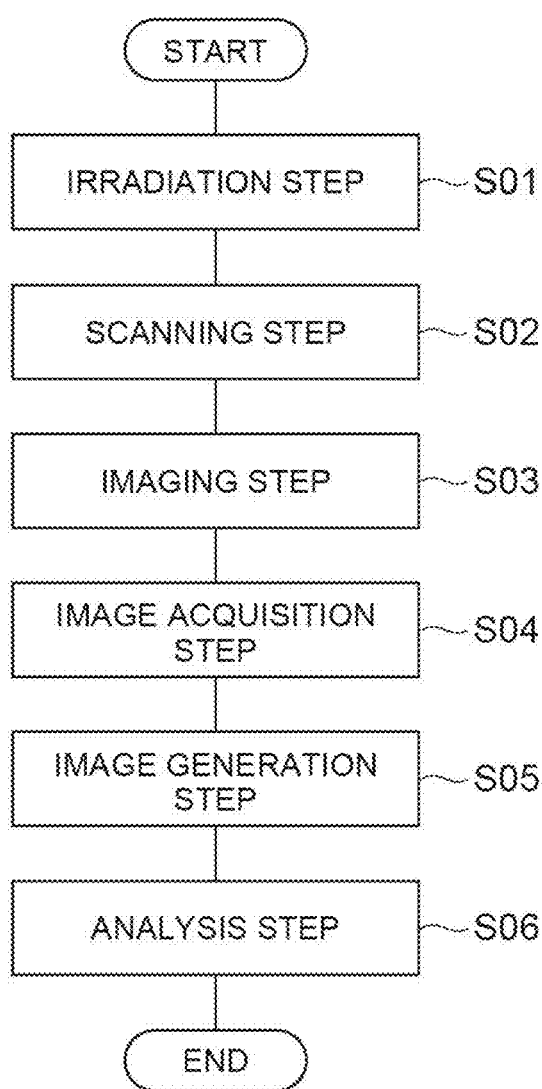
FIG. 12 is a flowchart showing an example of a sample observation method.

Next, the sample observation method using the sample observation device 1 described above will be described. FIG. 12 is a flowchart showing an example of the sample observation method. As shown in the figure, this sample observation method includes an irradiation step (step S01), a scanning step (step S02), an imaging step (step S03), an image acquisition step (step S04), and an image generation step (step S05), and an analysis step (step S06).

In the irradiation step S01, the sample S is irradiated with the planar light L2. When the operation to start measurement is input by the user, the light source 2 is driven on the basis of the control signal from the computer 7, and the light L1 is output from the light source 2. The light L1 output from the light source 2 is shaped by the irradiation optical system 3 to become the planar light L2, which is applied to the sample S.

In the scanning step S02, the sample S is scanned with respect to the irradiation surface R of the planar light L2. When the operation to start measurement is input by the user, the moving stage 12 is driven on the basis of the control signal from the computer 7 in synchronization with the drive of the light source 2. As a result, the sample container 11 is linearly driven in the Y-axis direction at a constant speed, and the sample S in the well 13 is scanned with respect to the irradiation surface R of the planar light L2.

In the imaging step S03, the observation light L3 generated in the sample S by irradiation with the planar light L2 is imaged on the imaging surface of the image acquisition unit 6 using the imaging optical system 5 having the observation axis P2 inclined with respect to the irradiation surface R. In the image acquisition step S04, the plurality of pieces of XZ image data 21 corresponding to the optical image of the observation light L3 imaged by the imaging optical system 5 are acquired in the Y-axis direction. The plurality of pieces of XZ image data 21 are sequentially output from the image acquisition unit 6 to the image generation unit 8.

In the image generation step S05, the observation image data of the sample S is generated on the basis of the plurality of pieces of XZ image data. Here, the two types of data, that is, the luminance image data 31 and the area image data 32 are generated as the observation image data of the sample S on the basis of the plurality of pieces of XZ image data 21 obtained in the image acquisition step S04. The luminance image data 31 is generated by combining the plurality of pieces of XZ image data 21 as a set (see FIG. 3). Further, the luminance values of each of the plurality of pieces of XZ image data 21 are binarized to generate the plurality of pieces of binarized XZ image data 25, and these pieces of the binarized XZ image data 25 are combined as a set to generate the area image data 32 (see FIG. 4). The generated luminance image data 31 and area image data 32 are output from the image generation unit 8 to the analysis unit 10.

Figure 13:
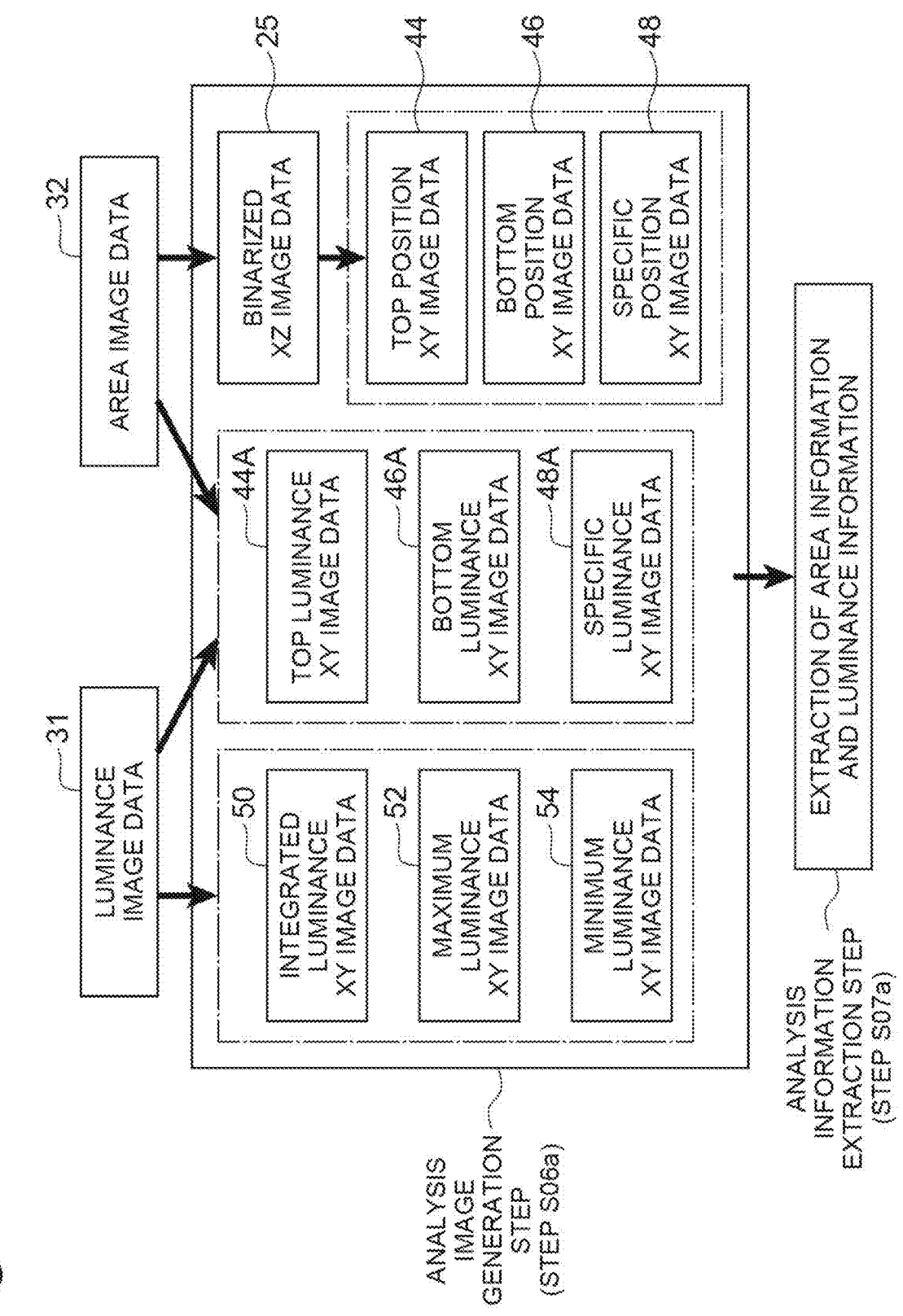
FIG. 13 is a diagram showing details of an analysis step.

More specifically, in the analysis step S06, as shown in FIG. 13, an analysis image generation step S06a and an analysis information extraction step S06b are executed. In the analysis image generation step S06a, various pieces of the XY image data are generated on the basis of the luminance image data 31 and the area image data 32 generated in the image generation step S05. Here, the integrated luminance XY image data 50, the maximum luminance XY image data 52, and the minimum luminance XY image data 54 are generated on the basis of the luminance image data 31. Further, the binarized XZ image data 25 is generated on the basis of the area image data 32, and the top position XY image data 44, the bottom position XY image data 46, and the specific position XY image data 48 are generated on the basis of the binarized XZ image data 25. Further, the top luminance XY image data 44A, the bottom luminance XY image data 46A, and the specific luminance XY image data 48A are generated on the basis of the luminance image data 31 and the area image data 32.

In the analysis information extraction step S06*b*, various pieces of the XY image data generated in the analysis image generation step S06*a* are analyzed. In the analysis information extraction step S06*b*, the area information including at least one of the top position in the Z-axis direction, the bottom position in the Z-axis direction, and the specific position in the Z-axis direction is extracted. Further, in the analysis information extraction step S06*b*, the luminance information including at least one of the integrated luminance in the Z-axis direction, the maximum luminance in the Z-axis direction, the minimum luminance in the Z-axis direction, the luminance at the top position in the Z-axis direction, the luminance at the bottom position in the Z-axis direction, and the luminance at the specific position in the Z-axis direction is extracted. Then, the feature amount for each sample S is analyzed on the basis of the extracted area information and the luminance information, and the storage of the analysis result, the display of the analysis result on the monitor or the like, and the like are performed. The storage of the generated various pieces of XY image data, the display of the generated various pieces of XY image data on the monitor or the like, and the like are performed.

As described above, in this sample observation device 1, the planar light L2 is applied on the XZ surface while the sample S is scanned on the Y axis, and the plurality of pieces of XZ image data 21 corresponding to the optical image of the observation light L3 generated in the sample S are acquired. Then, the observation image data 23 is generated on the basis of the plurality of pieces of XZ image data 21, the information on the sample S is extracted on the basis of the observation image data 23, and the analysis regarding the sample S is executed. Here, in the sample observation device, when the observation image data 23 is generated, the luminance image data 31 on the luminance of the sample S is generated on the basis of the plurality of pieces of XZ image data 21, the luminance values of each of the plurality of pieces of XZ image data 21 are binarized to generate the plurality of pieces of binarized XZ image data 25, and the area image data 32 on the existing area of the sample S is generated on the basis of the plurality of pieces of binarized XZ image data 25. By performing the analysis using the necessary image data among the generated luminance image data 31 and the area image data 32 in this way, the amount of data to be processed can be significantly reduced, and the processing required from the acquisition of the XZ image data 21 of the sample to the analysis of the sample can be speeded up.

For example, in a case where a plurality of pieces of fluorescence of the sample S are observed, it is assumed that there are a case where it is easy to obtain the optical image of the observation light L3 and a case where it is difficult to obtain the optical image of the observation light L3 depending on the type of the fluorescent substance. In such a case, the area image data 32 is generated using the fluorescence in which it is easy to obtain the optical image of the observation light L3, and the area information on the sample S is extracted, and thus it is possible to apply the area information to the analysis of the sample S in a case where the fluorescence in which it is difficult to obtain the optical image of the observation light L3 is used.

Specifically, in the sample observation device 1, the planar light L2 is applied on the XZ surface while the sample S is scanned on the Y axis, and the plurality of pieces of the XZ image data 21 are acquired on the basis of the observation light L3 having one wavelength λa (for example, a wavelength at which it is easy to obtain the optical image) generated in the sample S and the observation light L3 having the other wavelength λb (for example, a wavelength at which it is difficult to obtain the optical image) generated in the sample S. Next, observation image data 23A is generated on the basis of the plurality of pieces of XZ image data 21 corresponding to the observation light L3 having the one wavelength λa, and information X (the area information and the luminance information) on the sample S is extracted on the basis of the observation image data 23A. Then, observation image data 23B is generated on the basis of the plurality of pieces of XZ image data 21 corresponding to the observation light L3 having the other wavelength λb, and the analysis of the sample S based on the observation image data 23B is performed using the previously extracted information X.

Figure 14:
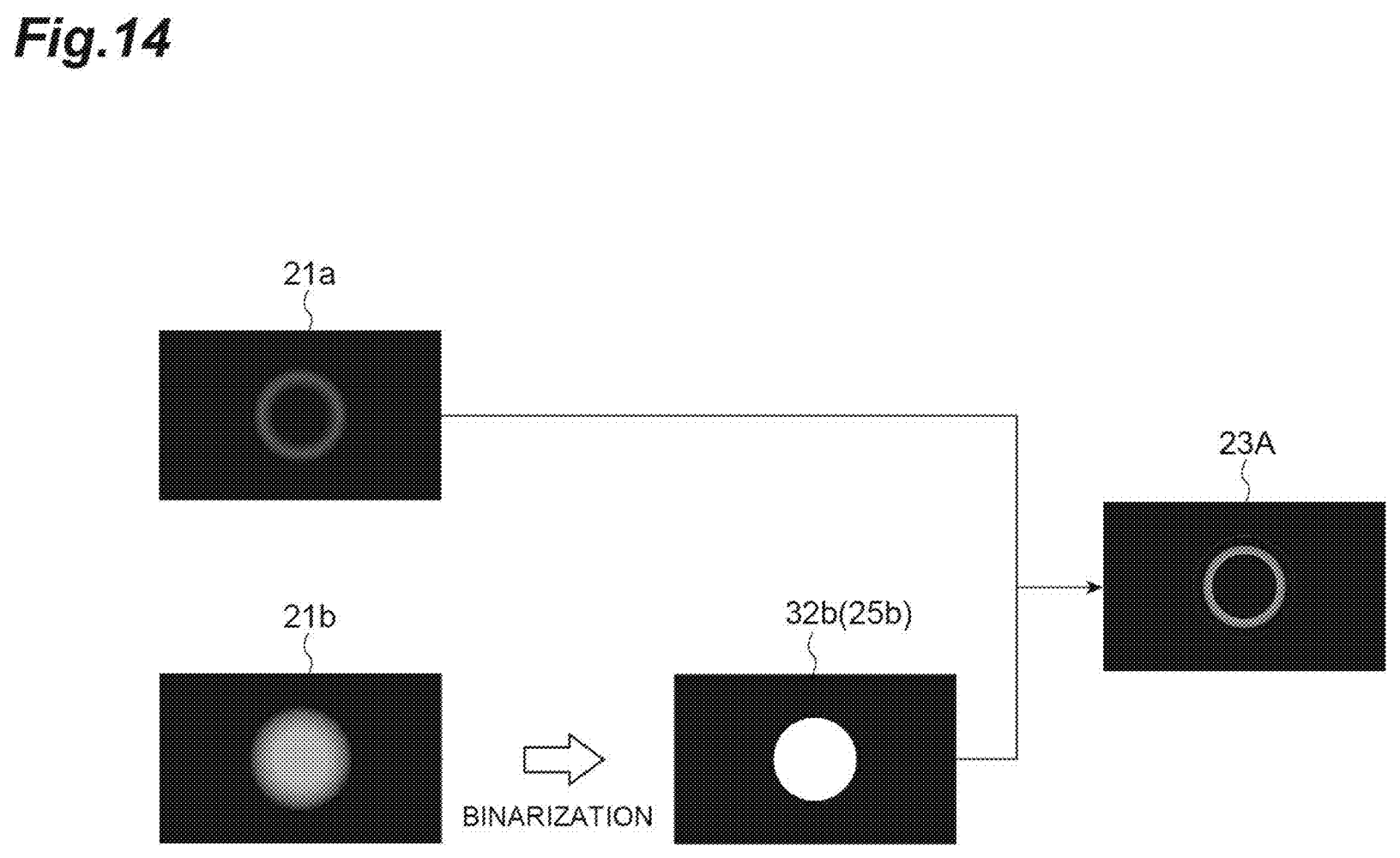

In the example of FIG. 14, the sample observation device 1 acquires a plurality of pieces of XZ image data 21*a* of observation light L3*a* having one wavelength λa generated in the sample S and acquires a plurality of pieces of XZ image data 21*b* of observation light L3*b* having the other wavelength λb generated in the sample S. Next, each of pieces of the XZ image data 21*b* of the observation light L3*b* having the other wavelength λb is binarized to generate a plurality of pieces of binarized XZ image data 25*b*. Then, an area image data 32*b* on the existing area of the sample S is generated on the basis of the plurality of pieces of binarized XZ image data 25*b*. In the example of FIG. 14, the entire pieces of binarized XZ image data 25*b* are used as the area image data 32*b*. The pixels corresponding to the area image data 32*b* are extracted from each of pieces of the XZ image data 21*a* of the observation light L3*a* having the one wavelength λa to generate the observation image data 23A.

Figure 15:
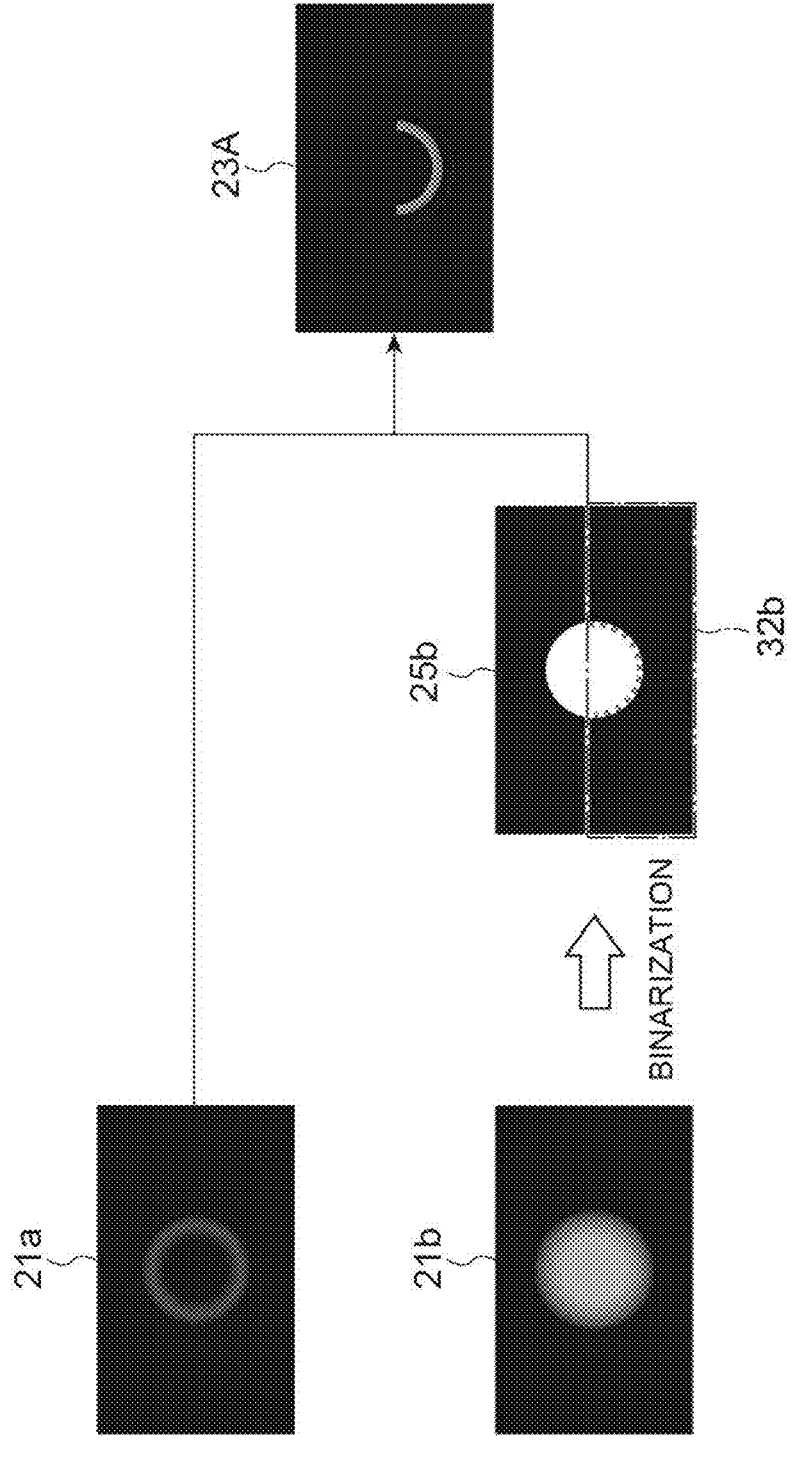
FIG. 15 is a schematic view showing another example of generation of observation image data based on XZ image data.
Figure 16:
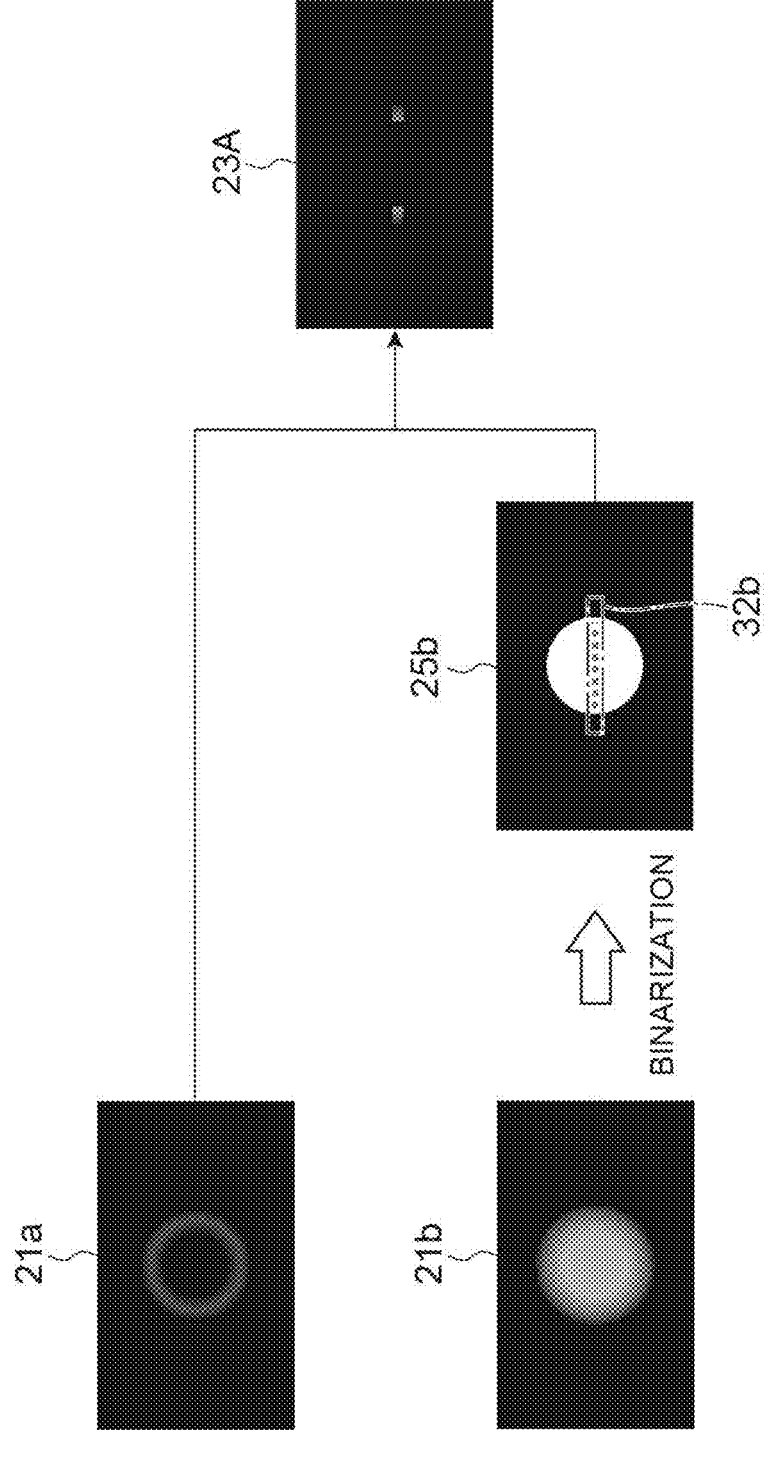
FIG. 16 is a schematic view showing a further example of generation of observation image data based on XZ image data.

In the example of FIG. 15, only a bottom area of each of pieces of the binarized XZ image data 25*b* obtained from the XZ image data 21*b* of the observation light L3*b* having the other wavelength λb generated in the sample S is selectively used as the area image data 32*b*. The pixels corresponding to the bottom area are extracted from each of pieces of the XZ image data 21*a* corresponding to the observation light L3*a* having the one wavelength λa to generate the observation image data 23A. In the example of FIG. 16, an arbitrary region (here, a center region) based on each of pieces of the binarized XZ image data 25*b* obtained from the XZ image data 21*b* of the observation light L3*b* having the other wavelength Ab generated in the sample S is selectively used as the area image data 32*b*. The pixels corresponding to the arbitrary area are extracted from each of pieces of the XZ image data 21*a* corresponding to the observation light L3*a* having the one wavelength λa to generate the observation image data 23A.

Figure 17:
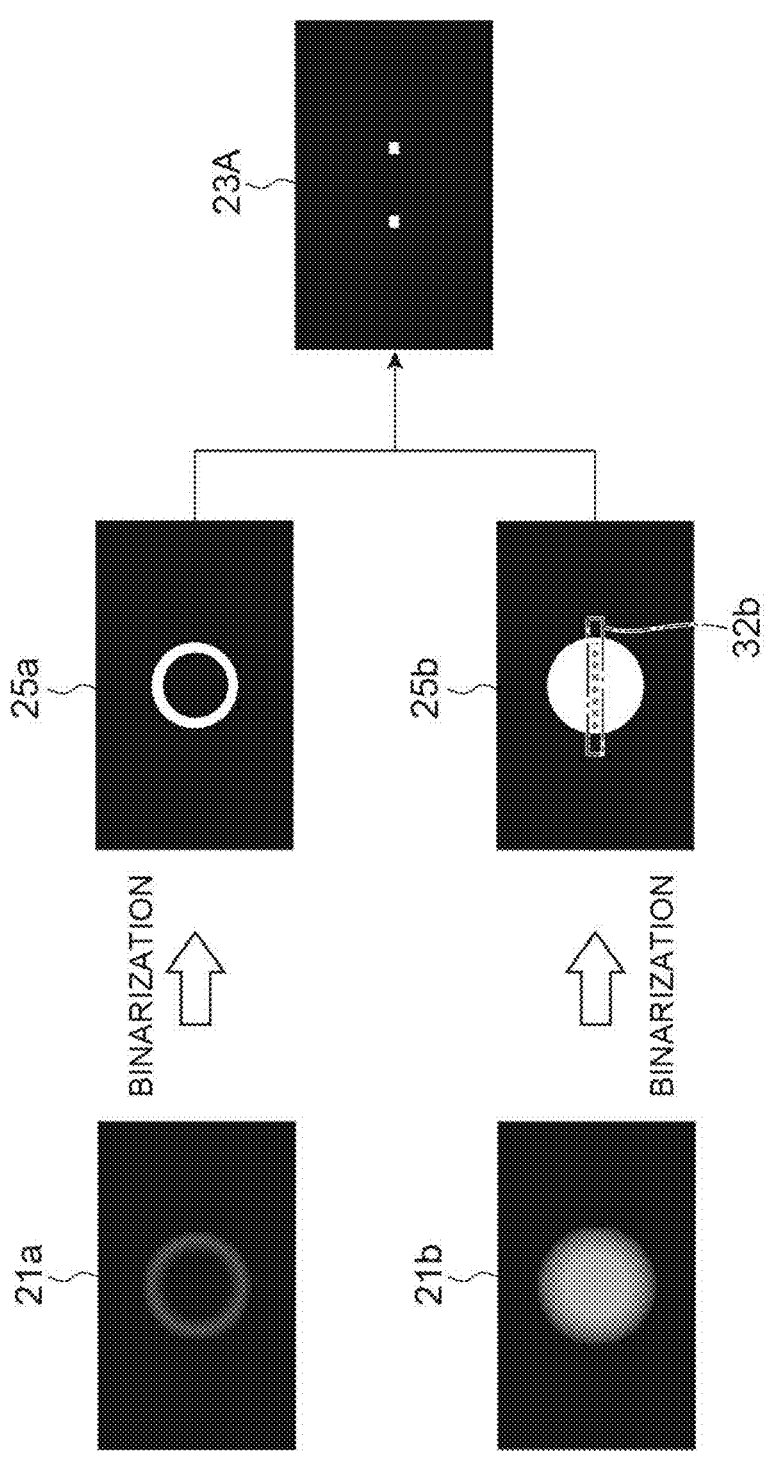
FIG. 17 is a schematic view showing yet another example of generation of observation image data based on XZ image data.

In the example of FIG. 17, the sample observation device 1 acquires a plurality of pieces of XZ image data 21*a* of observation light L3*a* having one wavelength λa generated in the sample S and acquires a plurality of pieces of XZ image data 21*b* of observation light L3*b* having the other wavelength λb generated in the sample S. Next, each of pieces of the XZ image data 21*a* of the observation light L3*a* having the one wavelength λa is binarized to generate a plurality of pieces of first binarized XZ image data 25*a* as luminance image data. Further, each of pieces of the XZ image data 21*b* of the observation light L3*b* having the other wavelength λb is binarized to generate a plurality of pieces of second binarized XZ image data 25*b*. Then, an area image data 32b on the existing area of the sample S is generated on the basis of the plurality of pieces of second binarized XZ image data 25b. In the example of FIG. 17, an arbitrary region (here, a center region) based on each of pieces of the second binarized XZ image data 25b is selectively used as the area image data 32b. Then, the pixels corresponding to the area image data 32b are extracted from each of pieces of the first binarized XZ image data 25a corresponding to the observation light L3a having the one wavelength λa to generate the observation image data 23A.

Further, in the sample observation device 1, the values of each of the plurality of pieces of binarized XZ image data 25 constituting the area image data 32 are integrated in the Z-axis direction to generate the thickness X image data 41, and pieces of the thickness X image data 41 are coupled in the Y-axis direction to generate the thickness XY image data 42 on the thickness of the sample. As a result, the information on the thickness of the sample S can be efficiently acquired and analyzed.

Further, in the sample observation device 1, the top pixel position in the Z-axis direction from each of the plurality of pieces of binarized XZ image data 25 constituting the area image data 32 is extracted to generate the top position X image data 43, and pieces of the top position X image data 43 are coupled in the Y-axis direction to generate the top position XY image data 44 on the top position of the sample S. Further, the top luminance XY image data 44A indicating the luminance value at the top position of the sample S is generated on the basis of the top position XY image data 44 and the luminance image data 31. As a result, the information on the top position of the sample S can be efficiently acquired and analyzed.

Further, in the sample observation device 1, the bottom pixel position in the Z-axis direction from each of the plurality of pieces of binarized XZ image data 25 constituting the area image data 32 is extracted to generate the bottom position X image data 45, and pieces of the bottom position X image data 45 are coupled in the Y-axis direction to generate the bottom position XY image data 46 on the bottom position of the sample S. Further, the bottom luminance XY image data 46A indicating the luminance value at the bottom position of the sample S is generated on the basis of the bottom position XY image data 46 and the luminance image data 31. As a result, the information on the bottom position of the sample S can be efficiently acquired and analyzed.

Further, in the sample observation device 1, the specific pixel position in the Z-axis direction from each of the plurality of pieces of binarized XZ image data 25 constituting the area image data 32 is extracted to generate the specific position X image data 47, and pieces of the specific position X image data 47 are coupled in the Y-axis direction to generate the specific position XY image data 48 on the specific position of the sample S. Further, the specific luminance XY image data 48A indicating the luminance value at the specific position of the sample S is generated on the basis of the specific position XY image data 48 and the luminance image data 31. As a result, the information on the specific position of the sample S can be efficiently acquired and analyzed.

Further, in the sample observation device 1, the luminance values of each of the plurality of pieces of XZ image data 21 constituting the luminance image data 31 are integrated in the Z-axis direction to generate the integrated luminance X image data 49, and pieces of the integrated luminance X image data 49 are coupled in the Y-axis direction to generate the integrated luminance XY image data 50 on the integrated luminance of the sample S. In the integrated luminance X image data 49, the Z-axis direction component of the background light included in one pixel can be made constant, and thus the influence of variation in the luminance value of the background light can be reduced. Therefore, even in the integrated luminance XY image data 50 obtained by coupling pieces of the integrated luminance X image data 49 in the Y-axis direction, the influence of the background light can be sufficiently reduced.

Further, in the sample observation device 1, the maximum luminance value in the Z-axis direction from each of the plurality of pieces of XZ image data 21 constituting the luminance image data 31 is extracted to generate the maximum luminance X image data 51, and pieces of the maximum luminance X image data 51 are coupled in the Y-axis direction to generate the maximum luminance XY image data 52 on the maximum luminance value of the sample S. As a result, the information on the distribution of the maximum luminance value of the sample S in the Z-axis direction can be efficiently acquired and analyzed.

Further, in the present embodiment, the minimum luminance value in the Z-axis direction from each of the plurality of pieces of XZ image data 21 constituting the luminance image data 31 is extracted to generate the minimum luminance X image data 53, and pieces of the minimum luminance X image data 53 are coupled in the Y-axis direction to generate the minimum luminance XY image data 54 on the minimum luminance value of the sample S. As a result, the information on the distribution of the minimum luminance value of the sample S in the Z-axis direction can be efficiently acquired and analyzed.

For example, in a case where a sample S having low fluorescence luminance or a sample S that does not emit fluorescence is observed, when a solution containing a fluorescent dye having high fluorescence luminance is injected into the well 13, the fluorescence luminance from the sample S may be lower than the background luminance. In such a case, by generating the minimum luminance XY image data 54, it is possible to observe the sample S having low fluorescence luminance or the sample S that does not emit fluorescence.

The present disclosure is not limited to the above embodiments. For example, in the above embodiment, the luminance image data 31 and the area image data 32 are generated as the observation image data 23 of the sample S, but only the area image data 32 may be generated as the observation image data. Further, regarding the configuration of the device, for example, the optical axis P1 of the planar light L2 and the input surface 15a of the sample container 11 do not necessarily have to be orthogonal to each other, and the optical axis P1 of the planar light L2 and the scanning direction of the sample S due to the scanning unit 4 do not necessarily have to be orthogonal to each other.

Further, for example, in the above embodiment, the transparent member 15 is provided in the sample container 11 to close one end side of the well 13, and the planar light L2 is input from the input surface 15a of the transparent member 15, but the planar light L2 may be input from the other end side of the well 13. In this case, the number of interfaces between media having different refractive indexes is reduced, and the number of refractions of the observation light L3 can be reduced. Further, the sample S may be held in a solid substance such as a gel instead of the sample container 11, and the sample S may be moved by causing a fluid such as water to flow into a transparent container like a flow cytometer.

Further, a plurality of pairs of the imaging optical system 5 and the image acquisition unit 6 may be disposed. In this case, an observation range can be expanded, and a plurality of pieces of observation light L3 having different wavelengths can be observed. Further, a plurality of image acquisition units 6 may be disposed with respect to an imaging optical system 5, or an image acquisition unit 6 may be disposed with respect to a plurality of imaging optical systems 5. The plurality of image acquisition units 6 may be formed by the combination of different types of optical detectors or image pickup devices. The light source 2 may be constituted by a plurality of light sources that output light having different wavelengths. In this case, the sample S can be irradiated with excitation light having different wavelengths.

Further, in order to alleviate astigmatism, a prism may be disposed in the imaging optical system 5. In this case, for example, the prism may be disposed behind the objective lens 16 (between the objective lens 16 and the image acquisition unit 6). As a measure against defocusing, an image pickup surface of the image pickup device in the image acquisition unit 6 may be tilted with respect to the observation axis P2. In addition, for example, a dichroic mirror or a prism may be disposed between the imaging optical system 5 and the image acquisition unit 6 to separate the wavelengths of the observation light L3.

REFERENCE SIGNS LIST

1 Sample observation device
3 Irradiation optical system
4 Scanning unit
5 Imaging optical system
6 Image acquisition unit
8 Image generation unit
10 Analysis unit
21 XZ image data
23 Observation image data
25 Binarized XZ image data
25a First binarized XZ image data
25b Second binarized XZ image data
31 Luminance image data
32 Area image data
41 Thickness X image data
42 Thickness XY image data
43 Top position X image data
44 Top position XY image data
44A Top luminance XY image data
45 Bottom position X image data
46 Bottom position XY image data
46A bottom luminance XY image data
47 Specific position X image data
48 Specific position XY image data
48A Specific luminance XY image data
49 Integrated luminance X image data
50 Integrated luminance XY image data
51 Maximum luminance X image data
52 Maximum luminance XY image data
53 Minimum luminance X image data
54 Minimum luminance XY image data
L2 Planar light
L3 Observation light
P2 Observation axis
R Irradiation surface
S sample

The invention claimed is:

1. A sample observation device comprising:
an irradiation optical system comprising an optical shaping element, configured to irradiate a sample with planar light on an XZ surface;
a scanning unit comprising a moving stage, configured to scan the sample in a Y-axis direction to pass through an irradiation surface of the planar light;
an imaging optical system comprising a lens, having an observation axis inclined with respect to the irradiation surface and configured to image an observation light generated in the sample by irradiation with the planar light;
an image acquisition unit comprising an image sensor, configured to acquire a plurality of pieces of XZ image data corresponding to an optical image of the observation light imaged by the imaging optical system;
an image generation unit comprising a processor, configured to generate observation image data of the sample on the basis of the plurality of pieces of XZ image data acquired by the image acquisition unit; and
an analysis unit comprising a processor, configured to extract information on the sample on the basis of the observation image data and to execute analysis on the sample,
wherein the image acquisition unit acquires a plurality of pieces of the XZ image data in the Y-axis direction, and
wherein the image generation unit generates luminance image data on luminance of the sample on the basis of the plurality of pieces of XZ image data, binarizes luminance values of each of the plurality of pieces of XZ image data to generate a plurality of pieces of binarized XZ image data, generates area image data on an existing area of the sample on the basis of the plurality of pieces of binarized XZ image data, and generates Z-axis position X image data from the area image data, a pixel value of the generated Z-axis position X image data is a coordinate value indicating a position in a Z-axis direction.

2. The sample observation device according to claim 1, wherein the analysis unit integrates values of each of the plurality of pieces of binarized XZ image data constituting the area image data in the Z-axis direction to generate thickness X image data and couples pieces of the thickness X image data in the Y-axis direction to generate thickness XY image data on a thickness of the sample.

3. The sample observation device according to claim 1, wherein the analysis unit extracts a top pixel position in the Z-axis direction from each of the plurality of pieces of binarized XZ image data constituting the area image data to generate top position X image data and couples pieces of the top position X image data in the Y-axis direction to generate top position XY image data on a top position of the sample.

4. The sample observation device according to claim 3, wherein the analysis unit generates top luminance XY image data indicating a luminance value at the top position of the sample on the basis of the top position XY image data and the luminance image data.

5. The sample observation device according to claim 1, wherein the analysis unit extracts a bottom pixel position in the Z-axis direction from each of the plurality of pieces of binarized XZ image data constituting the area image data to generate bottom position X image data and couples pieces of the bottom position X image data in the Y-axis direction to generate bottom position XY image data on a bottom position of the sample.

6. The sample observation device according to claim 5, wherein the analysis unit generates bottom luminance XY image data indicating a luminance value at the bottom position of the sample on the basis of the bottom position XY image data and the luminance image data.

7. The sample observation device according to claim 1, wherein the analysis unit extracts a specific pixel position in the Z-axis direction from each of the plurality of pieces of binarized XZ image data constituting the area image data to generate specific position X image data and couples pieces of the specific position X image data in the Y-axis direction to generate specific position XY image data on a specific position of the sample.

8. The sample observation device according to claim 7, wherein the analysis unit generates specific luminance XY image data indicating a luminance value at the specific position of the sample on the basis of the specific position XY image data and the luminance image data.

9. The sample observation device according to claim 1, wherein the analysis unit integrates luminance values of each of the plurality of pieces of XZ image data constituting the luminance image data in the Z-axis direction to generate integrated luminance X image data and couples pieces of the integrated luminance X image data in the Y-axis direction to generate integrated luminance XY image data on integrated luminance of the sample.

10. A sample observation device comprising:

an irradiation optical system comprising an optical shaping element, configured to irradiate a sample with planar light on an XZ surface;

a scanning unit comprising a moving stage, configured to scan the sample in a Y-axis direction to pass through an irradiation surface of the planar light;

an imaging optical system comprising a lens, having an observation axis inclined with respect to the irradiation surface and configured to image an observation light generated in the sample by irradiation with the planar light;

an image acquisition unit comprising an image sensor, configured to acquire a plurality of pieces of XZ image data corresponding to an optical image of the observation light imaged by the imaging optical system;

an image generation unit comprising a processor, configured to generate observation image data of the sample on the basis of the plurality of pieces of XZ image data acquired by the image acquisition unit; and an analysis unit comprising a processor, configured to extract information on the sample on the basis of the observation image data and to execute analysis on the sample, wherein the image acquisition unit acquires a plurality of pieces of the XZ image data in the Y-axis direction, wherein the image generation unit generates luminance image data on luminance of the sample on the basis of the plurality of pieces of XZ image data, binarizes luminance values of each of the plurality of pieces of XZ image data to generate a plurality of pieces of binarized XZ image data, and generates area image data on an existing area of the sample on the basis of the plurality of pieces of binarized XZ image data, and wherein the analysis unit extracts a maximum luminance value in a Z-axis direction from each of the plurality of pieces of XZ image data constituting the luminance image data to generate maximum luminance X image data and couples pieces of the maximum luminance X image data in the Y-axis direction to generate maximum luminance XY image data on a maximum luminance value of the sample.

11. A sample observation device comprising:

an irradiation optical system comprising an optical shaping element, configured to irradiate a sample with planar light on an XZ surface;

a scanning unit comprising a moving stage, configured to scan the sample in a Y-axis direction to pass through an irradiation surface of the planar light;

an imaging optical system comprising a lens, having an observation axis inclined with respect to the irradiation surface and configured to image an observation light generated in the sample by irradiation with the planar light;

an image acquisition unit comprising an image sensor, configured to acquire a plurality of pieces of XZ image data corresponding to an optical image of the observation light imaged by the imaging optical system;

an image generation unit comprising a processor, configured to generate observation image data of the sample on the basis of the plurality of pieces of XZ image data acquired by the image acquisition unit; and an analysis unit comprising a processor, configured to extract information on the sample on the basis of the observation image data and to execute analysis on the sample, wherein the image acquisition unit acquires a plurality of pieces of the XZ image data in the Y-axis direction, wherein the image generation unit generates luminance image data on luminance of the sample on the basis of the plurality of pieces of XZ image data, binarizes luminance values of each of the plurality of pieces of XZ image data to generate a plurality of pieces of binarized XZ image data, and generates area image data on an existing area of the sample on the basis of the plurality of pieces of binarized XZ image data, and wherein the analysis unit extracts a minimum luminance value in a Z-axis direction from each of the plurality of pieces of XZ image data constituting the luminance image data to generate minimum luminance X image data and couples pieces of the minimum luminance X image data in the Y-axis direction to generate minimum luminance XY image data on a minimum luminance value of the sample.

12. The sample observation device according to claim 1, wherein the image acquisition unit acquires a plurality of pieces of the XZ image data corresponding to an optical image of the observation light having a plurality of wavelengths, and wherein the image generation unit generates luminance image data on luminance of the sample on the basis of the plurality of pieces of XZ image data corresponding to an optical image of the observation light having one wavelength of the plurality of wavelengths, binarizes luminance values of each of the plurality of pieces of XZ image data corresponding to an optical image of the observation light having another wavelength of the plurality of wavelengths to generate a plurality of pieces of binarized XZ image data, and generates area image data on an existing area of the sample on the basis of the plurality of pieces of binarized XZ image data.

13. The sample observation device according to claim 1, wherein the image acquisition unit acquires a plurality of pieces of the XZ image data corresponding to an optical image of the observation light having a plurality of wavelengths, and wherein the image generation unit binarizes luminance values of each of the plurality of pieces of XZ image data corresponding to an optical image of the observation light having one wavelength of the plurality of wavelengths to generate a plurality of pieces of first binarized XZ image data, generates luminance image data on luminance of the sample on the basis of the first binarized XZ image data, binarizes luminance values of each of the plurality of pieces of XZ image data corresponding to an optical image of the observation light having another wavelength of the plurality of wavelengths to generate a plurality of pieces of second binarized XZ image data, and generates area image data on an existing area of the sample on the basis of the plurality of pieces of second binarized XZ image data.

14. A sample observation method comprising:

an irradiation step of irradiating a sample with planar light on an XZ surface;

a scanning step of scanning the sample in a Y-axis direction to pass through an irradiation surface of the planar light;

an imaging step of imaging of an observation light generated in the sample by irradiation with the planar light using an imaging optical system having an observation axis inclined with respect to the irradiation surface;

an image acquisition step of acquiring a plurality of pieces of XZ image data corresponding to an optical image of the observation light imaged by the imaging optical system;

an image generation step of generating observation image data of the sample on the basis of the plurality of pieces of XZ image data; and an analysis step of extracting information on the sample on the basis of the observation image data and executing analysis on the sample, wherein, in the image acquisition step, a plurality of pieces of the XZ image data are acquired in the Y-axis direction, and wherein, in the image generation step, luminance image data on luminance of the sample is generated on the basis of the plurality of pieces of XZ image data, luminance values of each of the plurality of pieces of XZ image data are binarized to generate a plurality of pieces of binarized XZ image data, area image data on an existing area of the sample is generated on the basis of the plurality of pieces of binarized XZ image data, and Z-axis position X image data is generated from the area image data, a pixel value of the generated Z-axis position X image data is a coordinate value indicating a position in a Z-axis direction.

15. The sample observation method according to claim 14, wherein, in the analysis step, values of each of the plurality of pieces of binarized XZ image data constituting the area image data are integrated in the Z-axis direction to generate thickness X image data, and pieces of the thickness X image data are coupled in the Y-axis direction to generate thickness XY image data on a thickness of the sample.

16. The sample observation method according to claim 14, wherein, in the analysis step, a top pixel position in the Z-axis direction from each of the plurality of pieces of binarized XZ image data constituting the area image data is extracted to generate top position X image data, and pieces of the top position X image data are coupled in the Y-axis direction to generate top position XY image data on a top position of the sample.

17. The sample observation method according to claim 16, wherein, in the analysis step, top luminance XY image data indicating a luminance value at the top position of the sample is generated on the basis of the top position XY image data and the luminance image data.

18. The sample observation method according to claim 14, wherein, in the analysis step, a bottom pixel position in the Z-axis direction from each of the plurality of pieces of binarized XZ image data constituting the area image data is extracted to generate bottom position X image data, and pieces of the bottom position X image data are coupled in the Y-axis direction to generate bottom position XY image data on a bottom position of the sample.

19. The sample observation method according to claim 18, wherein, in the analysis step, bottom luminance XY image data indicating a luminance value at the bottom position of the sample is generated on the basis of the bottom position XY image data and the luminance image data.

20. The sample observation method according to claim 14, wherein, in the analysis step, a specific pixel position in the Z-axis direction from each of the plurality of pieces of binarized XZ image data constituting the area image data is extracted to generate specific position X image data, and pieces of the specific position X image data are coupled in the Y-axis direction to generate specific position XY image data on a specific position of the sample.

21. The sample observation method according to claim 20, wherein, in the analysis step, specific luminance XY image data indicating a luminance value at the specific position of the sample is generated on the basis of the specific position XY image data and the luminance image data.

22. The sample observation method according to claim 14, wherein, in the analysis step, luminance values of each of the plurality of pieces of XZ image data constituting the luminance image data are integrated in the Z-axis direction to generate integrated luminance X image data, and pieces of the integrated luminance X image data are coupled in the Y-axis direction to generate integrated luminance XY image data on integrated luminance of the sample.

23. A sample observation method comprising:

an irradiation step of irradiating a sample with planar light on an XZ surface;

a scanning step of scanning the sample in a Y-axis direction to pass through an irradiation surface of the planar light;

an imaging step of imaging of an observation light generated in the sample by irradiation with the planar light using an imaging optical system having an observation axis inclined with respect to the irradiation surface;

an image acquisition step of acquiring a plurality of pieces of XZ image data corresponding to an optical image of the observation light imaged by the imaging optical system;

an image generation step of generating observation image data of the sample on the basis of the plurality of pieces of XZ image data; and an analysis step of extracting information on the sample on the basis of the observation image data and executing analysis on the sample, wherein, in the image acquisition step, a plurality of pieces of the XZ image data are acquired in the Y-axis direction, wherein, in the image generation step, luminance image data on luminance of the sample is generated on the basis of the plurality of pieces of XZ image data, luminance values of each of the plurality of pieces of XZ image data are binarized to generate a plurality of pieces of binarized XZ image data, and area image data on an existing area of the sample is generated on the basis of the plurality of pieces of binarized XZ image data, and wherein, in the analysis step, a maximum luminance value in a Z-axis direction from each of the plurality of pieces of XZ image data constituting the luminance image data is extracted to generate maximum luminance X image data, and pieces of the maximum luminance X image data are coupled in the Y-axis direction to generate maximum luminance XY image data on a maximum luminance value of the sample.

24. A sample observation method comprising:

an irradiation step of irradiating a sample with planar light on an XZ surface;

a scanning step of scanning the sample in a Y-axis direction to pass through an irradiation surface of the planar light;

an imaging step of imaging of an observation light generated in the sample by irradiation with the planar light using an imaging optical system having an observation axis inclined with respect to the irradiation surface;

an image acquisition step of acquiring a plurality of pieces of XZ image data corresponding to an optical image of the observation light imaged by the imaging optical system;

an image generation step of generating observation image data of the sample on the basis of the plurality of pieces of XZ image data; and an analysis step of extracting information on the sample on the basis of the observation image data and executing analysis on the sample, wherein, in the image acquisition step, a plurality of pieces of the XZ image data are acquired in the Y-axis direction, wherein, in the image generation step, luminance image data on luminance of the sample is generated on the basis of the plurality of pieces of XZ image data, luminance values of each of the plurality of pieces of XZ image data are binarized to generate a plurality of pieces of binarized XZ image data, and area image data on an existing area of the sample is generated on the basis of the plurality of pieces of binarized XZ image data, and wherein, in the analysis step, a minimum luminance value in a Z-axis direction from each of the plurality of pieces of XZ image data constituting the luminance image data is extracted to generate minimum luminance X image data, and pieces of the minimum luminance X image data are coupled in the Y-axis direction to generate minimum luminance XY image data on a minimum luminance value of the sample.

25. The sample observation method according to claim 14, wherein, in the image acquisition step, a plurality of pieces of the XZ image data corresponding to an optical image of the observation light having a plurality of wavelengths are acquired, and wherein, in the image generation step, luminance image data on luminance of the sample is generated on the basis of the plurality of pieces of XZ image data corresponding to an optical image of the observation light having one wavelength of the plurality of wavelengths, luminance values of each of the plurality of pieces of XZ image data corresponding to an optical image of the observation light having another wavelength of the plurality of wavelengths are binarized to generate a plurality of pieces of binarized XZ image data, and area image data on an existing area of the sample is generated on the basis of the plurality of pieces of binarized XZ image data.

26. The sample observation method according to claim 14, wherein, in the image acquisition step, a plurality of pieces of the XZ image data corresponding to an optical image of the observation light having a plurality of wavelengths are acquired, and wherein, in the image generation step, luminance values of each of the plurality of pieces of XZ image data corresponding to an optical image of the observation light having one wavelength of the plurality of wavelengths are binarized to generate a plurality of pieces of first binarized XZ image data, luminance image data on luminance of the sample is generated on the basis of the first binarized XZ image data, luminance values of each of the plurality of pieces of XZ image data corresponding to an optical image of the observation light having another wavelength of the plurality of wavelengths are binarized to generate a plurality of pieces of second binarized XZ image data, and area image data on an existing area of the sample is generated on the basis of the plurality of pieces of second binarized XZ image data.

* * * * *